United States Patent
Hatano

(10) Patent No.: US 10,541,621 B2
(45) Date of Patent: Jan. 21, 2020

(54) AC/DC CONVERTER EXTRACTING A FORWARD VOLTAGE AND A FLYBACK VOLTAGE FROM THE SECONDARY WINDING

(71) Applicant: Rohm Co., Ltd., Kyoto (JP)

(72) Inventor: Hiroyuki Hatano, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 16/118,575

(22) Filed: Aug. 31, 2018

(65) Prior Publication Data
US 2019/0081572 A1    Mar. 14, 2019

(30) Foreign Application Priority Data

Sep. 12, 2017    (JP) ................. 2017-175111
Jun. 6, 2018    (JP) ................. 2018-108563

(51) Int. Cl.
| | | |
|---|---|---|
| *H02M 7/217* | (2006.01) | |
| *H02M 1/00* | (2006.01) | |
| *H02M 7/48* | (2007.01) | |
| *H02M 1/42* | (2007.01) | |
| *H02M 3/335* | (2006.01) | |

(52) U.S. Cl.
CPC .......... *H02M 7/217* (2013.01); *H02M 1/4241* (2013.01); *H02M 3/335* (2013.01); *H02M 2001/0022* (2013.01); *H02M 2007/4815* (2013.01)

(58) Field of Classification Search
CPC ......... H02M 2001/0003; H02M 3/335; H02M 3/33507; H02M 3/33538; H02M 3/33584; H02M 3/337; H02M 7/217; H02M 7/155; H02M 7/66; H02M 7/68; H02M 7/72; H02M 7/757; H02M 7/797
See application file for complete search history.

(56) References Cited

U.S. PATENT DOCUMENTS 7,403,402 B2 * 7/2008 Odell .................... H02M 3/335
                                                                363/21.01
9,568,937 B1 * 2/2017 Brooks .................... G05F 5/00
(Continued)

FOREIGN PATENT DOCUMENTS

JP    2017-099261    6/2017

*Primary Examiner* — Yusef A Ahmed
*Assistant Examiner* — Shahzeb K Ahmad
(74) *Attorney, Agent, or Firm* — Fish & Richardson P.C.

(57) ABSTRACT

An AC-DC converter 1 has, e.g.: a primary winding 11 to which an alternating-current input voltage Vi is applied; a secondary winding 12 magnetically coupled with the primary winding 11; a bidirectional switch 20 connected in series with the primary winding 11; a resonance capacitor 30 connected in parallel with at least one of the bidirectional switch 20 and the primary winding 11; a resonance inductance component (e.g., a coil 120); a full-wave rectification circuit 40 performing full-wave rectification on an induced voltage appearing in the secondary winding 12; and a smoothing capacitor 50 smoothing the output of the full-wave rectification circuit 40. The alternating-current input voltage Vi is converted directly into a direct-current output voltage Vo, with both a forward voltage and a flyback voltage extracted from the secondary winding 12. The converter 1 further has a switch 200 switching the number of turns of the primary winding.

18 Claims, 29 Drawing Sheets

(56) References Cited

U.S. PATENT DOCUMENTS

| | | | | |
|---|---|---|---|---|
| 2006/0092677 A1* | 5/2006 | Moussaoui | ......... | H02M 7/4826 |
| | | | | 363/71 |
| 2008/0285319 A1* | 11/2008 | Deisch | .............. | H02M 3/33507 |
| | | | | 363/90 |
| 2009/0290389 A1* | 11/2009 | Ueno | .................... | H02M 3/337 |
| | | | | 363/21.02 |
| 2013/0201726 A1* | 8/2013 | Hu | ......................... | H02M 3/28 |
| | | | | 363/17 |
| 2014/0029312 A1* | 1/2014 | Telefus | ............. | H02M 3/33523 |
| | | | | 363/21.02 |
| 2016/0149500 A1* | 5/2016 | Stamm | ............... | H05B 33/0815 |
| | | | | 363/21.13 |
| 2017/0141689 A1 | 5/2017 | Hatano | | |
| 2017/0176916 A1* | 6/2017 | Kobayashi | ........ | H02M 3/33546 |
| 2017/0271096 A1* | 9/2017 | Wang | ...................... | H01F 29/04 |

\* cited by examiner

AC/DC CONVERTER EXTRACTING A FORWARD VOLTAGE AND A FLYBACK VOLTAGE FROM THE SECONDARY WINDING

This application is based on the following Japanese Patent Applications, the contents of which are hereby incorporated by reference:

(1) Japanese Patent Application published as No. 2017-175111, filed on Sep. 12, 2017

(2) Japanese Patent Application published as No. 2018-108563, filed on Jun. 6, 2018

BACKGROUND OF THE INVENTION

1. Field of the Invention

The invention disclosed herein relates to AC-DC converters.

2. Description of Related Art

Today there are proposed AC-DC converters that can convert an alternating-current input voltage directly into a direct-current output voltage (see, for example, Japanese Patent Application published as No. 2017-99261, filed by the applicant).

However, in the conventional AC-DC converters mentioned above, for example, when the alternating-current input voltage changes from 100 V to 220 V, assuming that the direct-current output voltage is constant, the input current falls to one-half or less, and the on-period of a primary-side switch shortens to about one-fourth. This makes switching control difficult. Reversely, when the alternating-current input voltage changes from 220 V to 100 V, the input current rises to twice or more, and the on-period of a primary-side switch lengthens to about four times. This too makes switching control difficult. Thus, with the conventional AC-DC converters mentioned above, inconveniently, it is difficult to cope with varying alternating-current input voltages.

Also, the conventional AC-DC converters mentioned above leave room for further improvement in terms of the switching noise resulting from a primary-side switch turning on and off.

SUMMARY OF THE INVENTION

In view of the problems encountered by the present inventor, an object of the invention disclosed herein is to provide an AC-DC converter that can cope with varying alternating-current input voltages or an AC-DC converter that can reduce switching noise.

According to one aspect of what is disclosed herein, an AC-DC converter includes: a primary winding to which an alternating-current input voltage is applied; a secondary winding which is magnetically coupled with the primary winding; a bidirectional switch which is connected in series with the primary winding; a resonance capacitor which is connected in parallel with at least one of the bidirectional switch and the primary winding; a resonance inductance component; a full-wave rectification circuit which performs full-wave rectification on an induced voltage that appears in the secondary winding; and a smoothing capacitor which smoothes the output of the full-wave rectification circuit. The AC-DC converter converts the alternating-current input voltage directly into a direct-current output voltage by extracting both a forward voltage and a flyback voltage from the secondary winding. The AC-DC converter further includes a switch which switches either the number of turns of the primary winding or both the number of turns of the primary winding and the capacitance value of the resonance capacitor.

According to another aspect of what is disclosed herein, an AC-DC converter includes: a primary winding to which an alternating-current input voltage is applied; a secondary winding which is magnetically coupled with the primary winding; a bidirectional switch which is connected in series with the primary winding; a resonance capacitor which is connected in parallel with at least one of the bidirectional switch and the primary winding; a resonance inductance component; a full-wave rectification circuit which performs full-wave rectification on an induced voltage that appears in the secondary winding; and a smoothing capacitor which smoothes the output of the full-wave rectification circuit. The AC-DC converter converts the alternating-current input voltage directly into a direct-current output voltage by extracting both a forward voltage and a flyback voltage from the secondary winding. The primary winding includes a first primary winding and a second primary winding, and the bidirectional switch is connected in series between the first and second primary windings.

According to yet another aspect of what is disclosed herein, an AC-DC converter includes: a primary winding to which an alternating-current input voltage is applied; a secondary winding which is magnetically coupled with the primary winding; a bidirectional switch which is connected in series with the primary winding; a resonance capacitor which is connected in parallel with at least one of the bidirectional switch and the primary winding; a resonance inductance component; a full-wave rectification circuit which performs full-wave rectification on an induced voltage that appears in the secondary winding; an a smoothing capacitor which smoothes the output of the full-wave rectification circuit. The AC-DC converter converts the alternating-current input voltage directly into a direct-current output voltage by extracting both a forward voltage and a flyback voltage from the secondary winding. The AC-DC converter further includes a switch which switches either the number of turns of the primary winding or both the number of turns of the primary winding and the capacitance value of the resonance capacitor. The primary winding includes a first primary winding and a second primary winding, and the bidirectional switch is connected in series between the first and second primary windings.

Other features, elements, steps, benefits, and characteristics of the present invention will become clearer with reference to the following description of preferred embodiments thereof in conjunction with the accompanying drawings.

DETAILED DESCRIPTION OF PREFERRED EMBODIMENTS

Figure 1A:
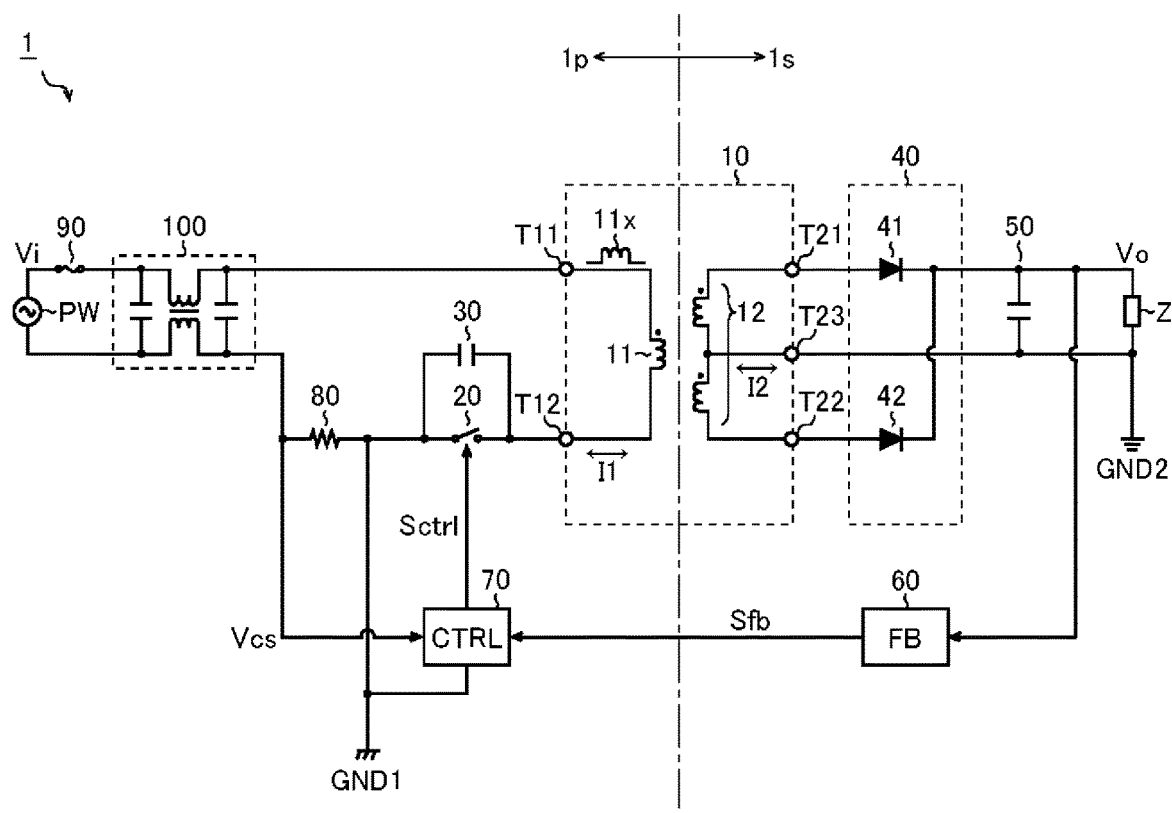
FIG. 1A is a circuit diagram of an AC-DC converter with a basic configuration (as a comparative example)

FIG. 1A is a circuit diagram of an AC-DC converter with a basic configuration (serving as a comparative example with which to compare the embodiments that will be described later). The AC-DC converter 1 of this configuration example is a power supply device that converts an alternating-current input voltage Vi supplied from an alternating-current power source PW directly into a direct-current output voltage Vo and feeds this to a load Z while electrically isolating a primary circuit system 1p (GND1 system) and a secondary circuit system 1s (GNS2 system) from each other. The AC-DC converter 1 includes a transformer 10, a bidirectional switch 20, a resonance capacitor 30, a full-wave rectification circuit 40, a smoothing capacitor 50, a feedback circuit 60, a control circuit 70, a sense resistor 80, a power fuse 90, and a filter circuit 100.

The transformer 10 includes a primary winding 11, which is provided in the primary circuit system 1p, and a secondary winding 12, which is provided in the secondary circuit system is and is magnetically coupled with the primary winding 11. A first tap T11 of the primary winding 11 is connected via the filter circuit 100 and the power fuse 90 to a first terminal of the alternating-current power source PW. A second tap T12 of the primary winding 11 is connected via the bidirectional switch 20, the sense resistor 80, and the filter circuit 100 to a second terminal of the alternating-current power source PW. A first tap T21 and a second tap T22 of the secondary winding 12 are connected, individually via the full-wave rectification circuit 40, both to an output terminal of the direct-current output voltage Vo (that is, a first terminal of the load Z). A center tap T23 of the secondary winding 12 is connected to a secondary-side common GND2 (that is, a second terminal of the load Z).

In particular, in the AC-DC converter 1 of this configuration example, used as the transformer 10 is a leakage transformer, or a resonance transformer, that has a leakage inductance 11x (the reason will be given later). In the diagram, for convenience' sake, the leakage inductance 11x is depicted as being present on the first tap T11 side of the primary winding 11.

A first terminal of the bidirectional switch 20 is connected to the second tap T12 of the primary winding 11. A second terminal of the bidirectional switch 20 is connected to a first terminal of the sense resistor 80 and also to a primary-side common GND1. So connected, the bidirectional switch 20 functions as an output switch that, according to a control signal Sctrl fed in from the control circuit 70, turns on and off a primary current I1 that flows through the primary winding 11.

The resonance capacitor 30 is connected in parallel with the bidirectional switch 20, and forms, along with the primary winding 11 of the transformer 10 and the leakage inductance 11x, an LLC resonance circuit. Thus, owing to a leakage transformer or a resonance transformer being used as the transformer 10, even if surplus energy that is not fed from the primary winding 11 to the secondary winding 12 arises, it can be used through regeneration. It is thus possible to eliminate a drop in the conversion efficiency of the AC-DC converter 1.

Providing the resonance capacitor 30 results in gentle energy variation in the transformer 10 at the turning-off of the bidirectional switch 20. This eliminates the need for a surge absorbing device such as a snubber circuit, which is conventionally considered indispensable, and also helps reduce harmonic components.

Figure 1B:
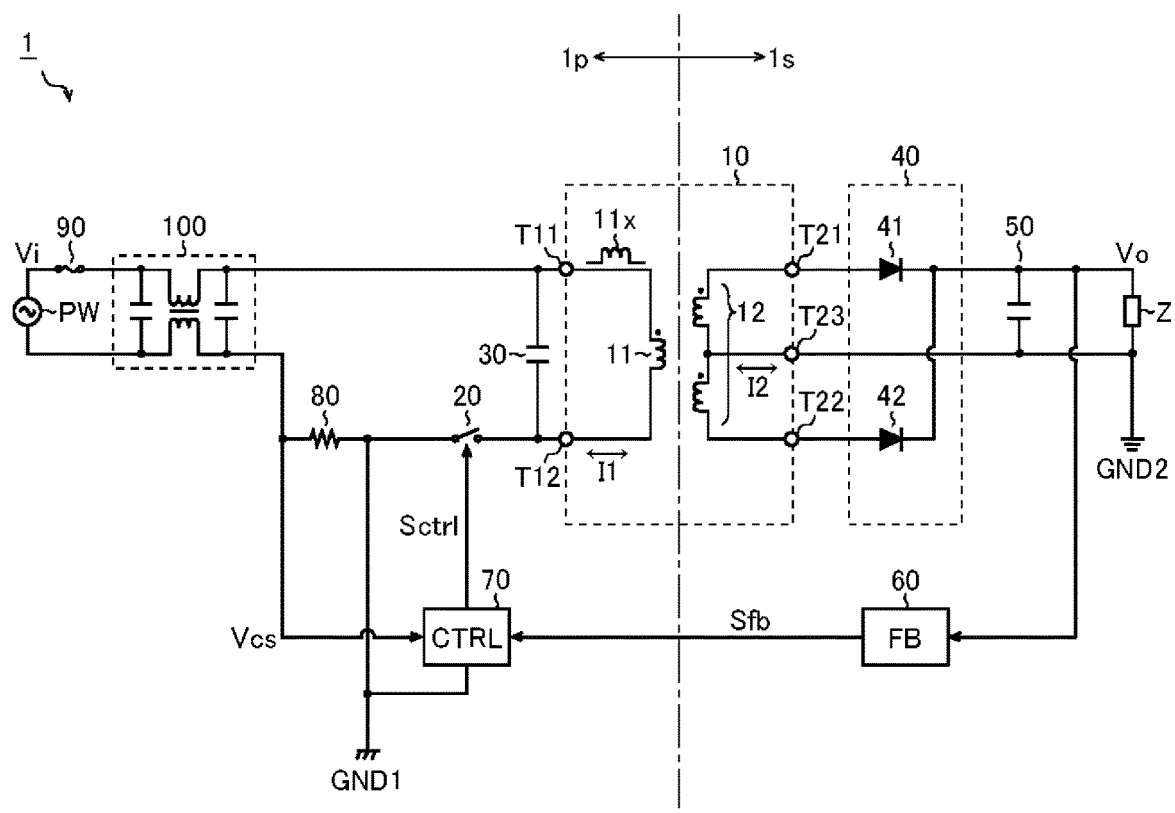
FIG. 1B is a circuit diagram of an AC-DC converter according to a first modified example.
Figure 1C:
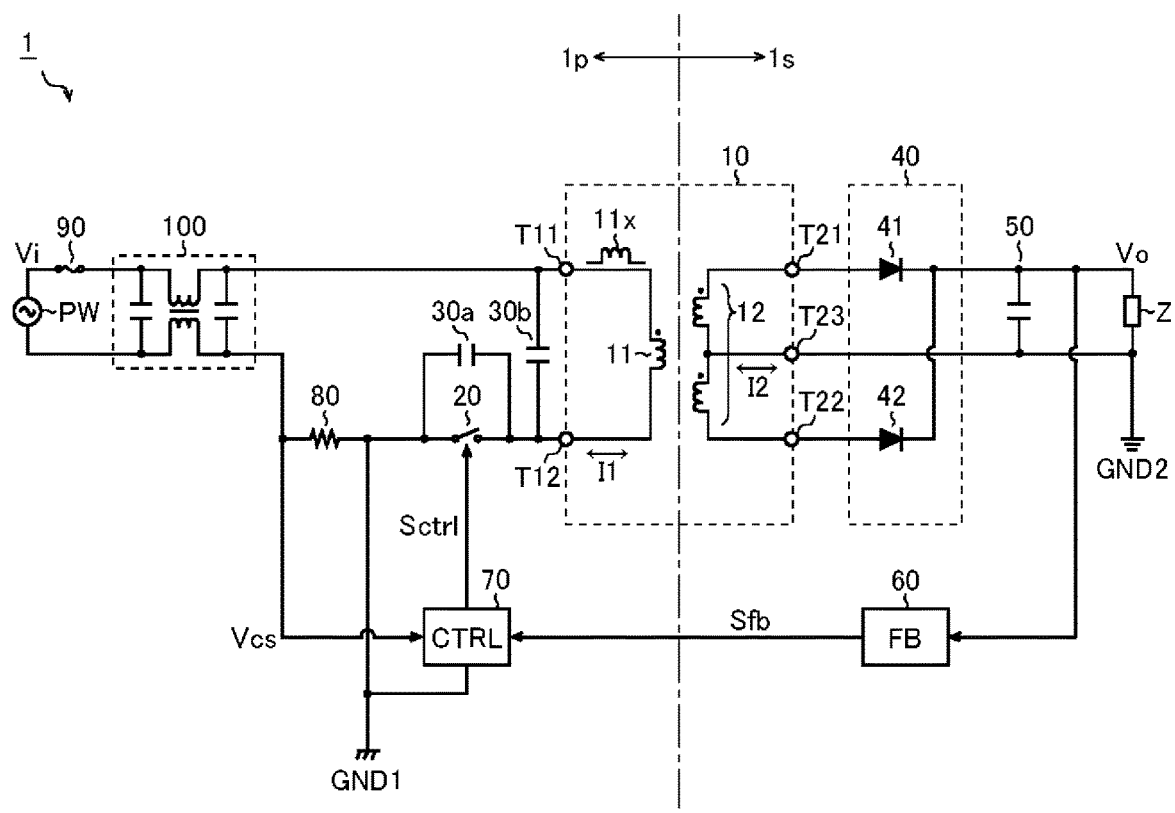
FIG. 1C is a circuit diagram of an AC-DC converter according to a second modified example.

The resonance capacitor 30 can be connected differently: it can be connected, as shown in FIG. 1B, in series with the bidirectional switch 20 (that is, the resonance capacitor 30 can be connected in parallel with the primary winding 11 of the transformer 10); or, as shown in FIG. 1C, one resonance capacitor 30a can be connected in parallel with the bidirectional switch 20, and another resonance capacitor 30b can be connected in series with the bidirectional switch 20.

The full-wave rectification circuit 40 is a circuit portion that performs full-wave rectification on an induced voltage (flyback voltage or forward voltage, which will be discussed in detail later) that appears in the secondary winding 12. The full-wave rectification circuit 40 includes diodes 41 and 42. An anode of the diode 41 is connected to the first tap T21 of the secondary winding 12. An anode of the diode 42 is connected to the second tap T22 of the secondary winding 12. The cathode of the diode 41 and the cathode of the diode 42 are both connected to the output terminal of the direct-current output voltage Vo.

When the diode 41 is forward-biased and the diode 42 is reverse-biased, a secondary current I2 flows along a current path leading from the first tap T21 of the secondary winding 12 via the diode 41 to the output terminal of the direct-current output voltage Vo. On the other hand, when the diode 42 is forward-biased and the diode 41 is reverse-biased, the secondary current I2 flows from the second tap T22 of the secondary winding 12 via the diode 42 to the output terminal of the direct-current output voltage Vo.

The center tap T23 of the secondary winding 12 can be omitted, in which case the full-wave rectification circuit 40 can be configured as a diode bridge.

The smoothing capacitor 50 is connected between the output terminal of the direct-current output voltage Vo and the secondary-side common GND2. The smoothing capacitor 50 smoothes the output of the full-wave rectification circuit 40 to produce the direct-current output voltage Vo.

The feedback circuit 60 generates a feedback signal Sfb commensurate with the direct-current output voltage Vo to output the feedback signal Sfb to the control circuit 70. For isolated transfer of the feedback signal Sfb from the secondary circuit system 1s to the primary circuit system 1p, an isolated transfer device such as a photocoupler can be used.

The control circuit 70 operates relative to the primary-side common GND1 as a reference potential, and generates the control signal Sctrl for turning on and off the bidirectional switch 20. The control circuit 70 has a function of monitoring the feedback signal Sfb fed in from the feedback circuit 60 to turn on and off the bidirectional switch 20 such that the direct-current output voltage Vo remains equal to a desired target value (that is, an output feedback control function). With this function, it is possible to supply the load Z with a constant direct-current output voltage Vo stably.

The control circuit 70 also has a function of monitoring a sense voltage Vcs (which is a voltage signal commensurate with the primary current I1) appearing at a second terminal of the sense resistor 80 to turn on and off the bidirectional switch 20 such that the primary current I1 does not exceed a predetermined upper limit value (that is, a constant current control function). With this function, it is possible to prevent an excessively high primary current I1 from flowing in the primary circuit system 1p, and thus to enhance the safety of the AC-DC converter 1.

The control circuit 70 also has a function of monitoring the terminal-to-terminal voltage across the resonance capacitor 30 (and hence the terminal-to-terminal voltage across the bidirectional switch 20) and watching for the voltage value of that voltage to become equal zero to turn on the bidirectional switch 20 at that time (that is, a ZVS (zero-voltage switching) function). With this function, it is possible to reduce the switching loss due to the parasitic capacitance of the bidirectional switch 20 and the resonance capacitor 30, and thus to enhance the conversion efficiency of the AC-DC converter 1.

The control circuit 70 further has a function of monitoring the feedback signal Sfb and the sense voltage Vcs to turn on and off the bidirectional switch 20 such that the power factor remains close to zero (that is, a power factor improving function). With this function, no separate power factor improving circuit is needed any longer, and it is thus possible to build a single-converter AC-DC converter 1. For higher power factor improvement accuracy, it is preferable that the control circuit 70 monitor also the alternating-current input voltage Vi.

The sense resistor 80 (with a resistance value of R80) is inserted in the current path along which the primary current I1 flows, and generates the sense voltage Vcs (=I1×R80) commensurate with the primary current I1.

The power fuse 90 blows when a current equal to or higher than the rated current flows, to protect the circuits in the succeeding stages.

The filter circuit 100 includes an X capacitor for reducing differential-mode noise (also called normal-mode noise) and a common-mode filter (a ring-form core with two coils wound around it in the same direction) for reducing common-mode noise, and eliminates various noise components contained in the alternating-current input voltage Vi. A first input terminal of the filter circuit 100 is connected via the power fuse 90 to the first terminal of the alternating-current power source PW. A second input terminal of the filter circuit 100 is connected to the second terminal of the alternating-current power source PW. A first output terminal of the filter circuit 100 is connected to the first tap T11 of the primary winding 11. A second output terminal of the filter circuit 100 is connected to the second terminal of the sense resistor 80.

Figure 2:
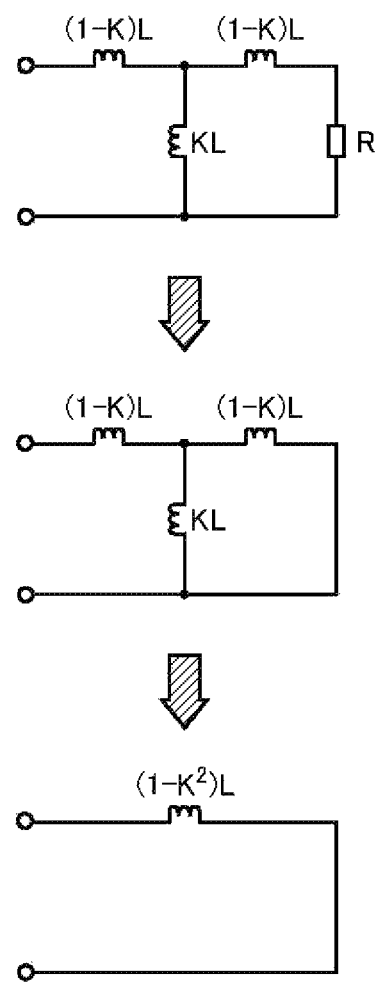
FIG. 2 is an equivalent circuit diagram of a transformer.

FIG. 2 is an equivalent circuit diagram of the transformer 10. As shown in the upper tier of the diagram, let the coupling coefficient of the transformer 10 be K, then the exciting inductance is given by KL, and the leakage inductance of the transformer 10 is given by $(1-K)L$.

Now, consider a case where the load R connected to the secondary side of the transformer 10 equals 0Ω (as when the AC-DC converter 1 starts up or its output is short-circuited). In this case, as shown in the middle tier of the diagram, the exciting inductance KL is short-circuited across it. Accordingly, as shown in the lower tier of the diagram, the equivalent inductance of the transformer 10 is given by $(1-K^2)L$.

Here, in a case where the coupling coefficient K of the transformer 10 is high (for example, when K≈1), the equivalent inductance $(1-K^2)L$ of the transformer 10 nearly equals zero. This creates a state where a very high current flows in the transformer 10, and is thus undesirable.

To avoid that, in the AC-DC converter 1 of this configuration example, as the transformer 10, a leakage transformer, or a resonance transformer, that has a low coupling coefficient K (for example, K=0.6 to 0.9) is used. With this configuration, even when the AC-DC converter 1 starts up or its output is short-circuited, the equivalent inductance $(1-K^2)L$ of the transformer 10 does not become too low, and this helps solve the above-mentioned problem.

As mentioned previously, the leakage inductance 11x of the transformer 10 can be exploited as a constituent element of the LLC resonance circuit, and can thus contribute to enhanced conversion efficiency of the AC-DC converter 1.

The leakage inductance 11x of the transformer 10 also serves as a choke coil. Thus, with the AC-DC converter 1 of this configuration example, it is possible, despite adopting a flyback-type circuit configuration, to use both flyback operation and forward operation.

If, for discussion's sake, a closely coupled transformer with a high coupling coefficient K (for example, K≈0.99) is used, the on-period of the bidirectional switch 20 in forward operation is too short, and this makes the switching operation by the control circuit 70 extremely difficult. Thus, it can be said that, also from the viewpoint of control stability, it is important to use as the transformer 10 a leakage transformer, or a resonance transformer, with a low coupling coefficient K.

Figure 3:
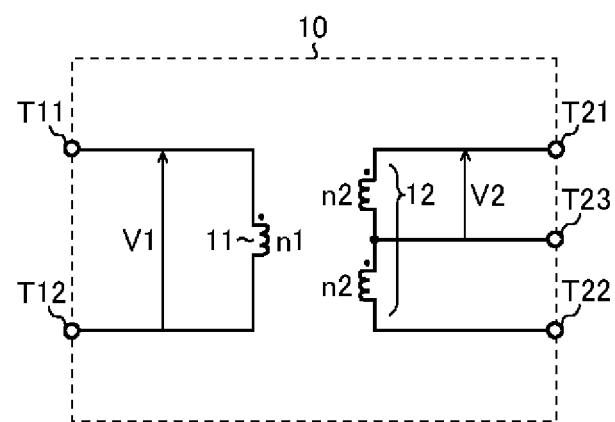
FIG. 3 is a schematic diagram illustrating a relationship between the input-output ratio and the winding ratio of a transformer.

FIG. 3 is a schematic diagram illustrating the relationship between the input-output ratio and the winding ratio of the transformer 10. Let n1 be the number of turns of the primary winding 11, let n2 be the number of turns of the secondary winding 12 (in this configuration example, the number of turns from the first or second tap T21 or T22 to the center tap T23), let V1 be the voltage applied to the primary winding 11, and let V2 be the voltage applied to the secondary winding 12. Then, in general, formula (1) below holds.

$$V2=(n2/n1) \times V1 \times K \qquad (1)$$

Here, driving the transformer 10 only in flyback operation requires that formula (2) below be fulfilled. In formula (2), V1max represents the maximum voltage applied to the primary winding 11.

$$n2/n1 < V2/(V1\max \times K) \qquad (2)$$

In contrast, in the AC-DC converter 1 of this configuration example, compatibility between flyback operation and forward operation is achieved through the fulfillment of formula (3) below.

$$n2/n1 \geq V2/(V1\max \times K) \qquad (3)$$

Figure 4:
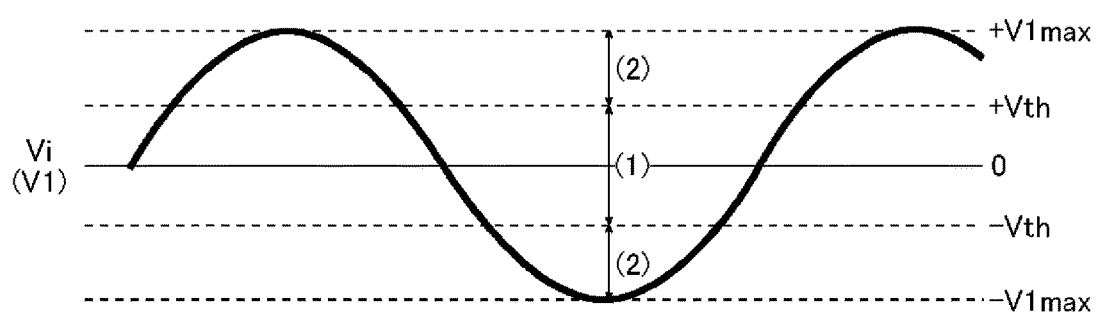
FIG. 4 is a schematic diagram showing a relationship between an alternating-current input voltage and operation modes.

FIG. 4 is a schematic diagram showing the correlation between the alternating-current input voltage Vi (that is, a voltage V1 applied to the primary winding 11) and the operation mode of the AC-DC converter 1. As shown there, the AC-DC converter 1 of this configuration example operates in one of the following two operation modes in accordance with the periodic variation of the alternating-current input voltage Vi: a first operation mode (see the voltage range (1)) in which only flyback operation is used; and a second operation mode (see the voltage range (2)) in which flyback operation and forward operation are used in combination.

Specifically, in a case where a threshold voltage ±Vth is set such that −V1max<−Vth<0<+Vth<+V1max, in the voltage range where −Vth<Vi<+Vth, the first operation mode, in which only flyback operation is used. is in effect. On the other hand, in the voltage range where −V1max≤Vi≤−Vth or +Vth≤Vi≤+V1max, the second operation mode, in which flyback operation and forward operation are used in combination, is in effect.

Figure 5:
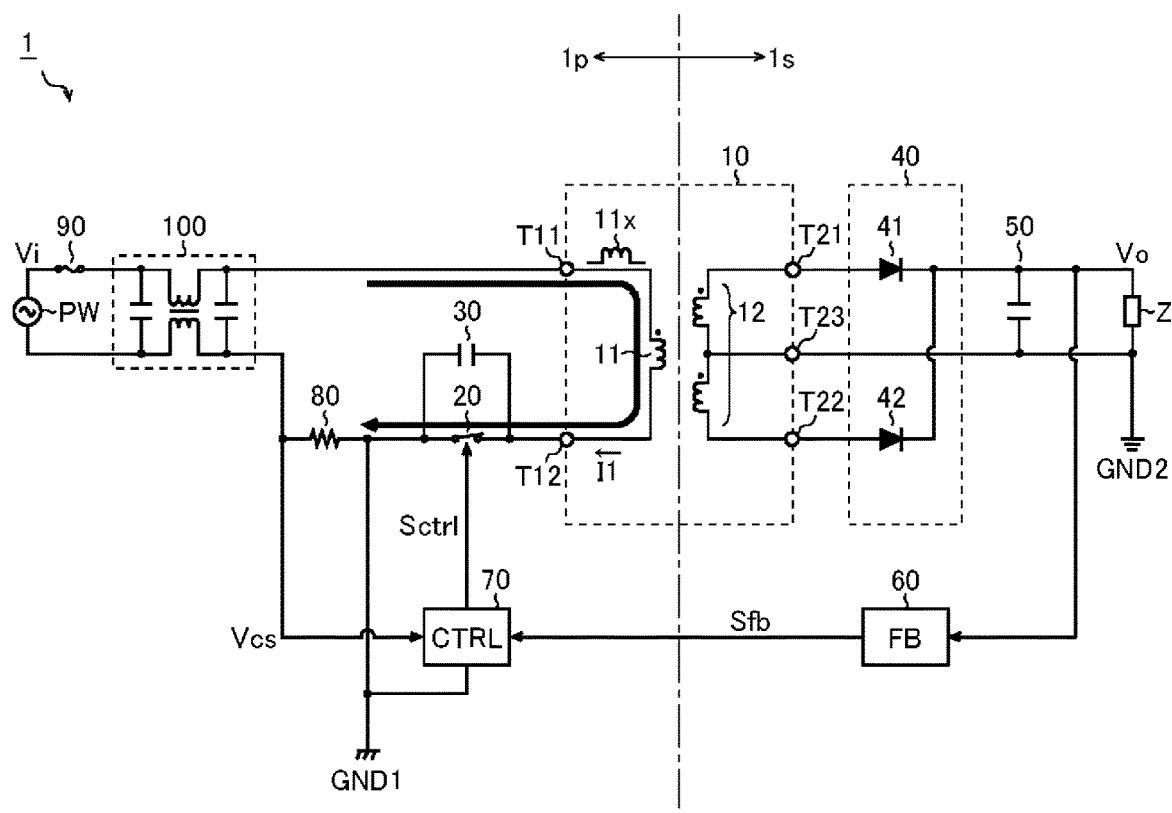
FIG. 5 is a circuit diagram showing a current path in a switch-on period in a first operation mode.

FIG. 5 is a circuit diagram showing the current path in a switch-on period in the first operation mode (flyback operation only). During the on-period of the bidirectional switch 20, a primary current I1 flows in the primary circuit system 1p, and thus energy is stored in the primary winding 11. For example, when the alternating-current input voltage Vi is positive (T11>T12), as indicated by a thick solid-line arrow in the diagram, the primary current I1 flows in the direction from the alternating-current power source PW to the primary winding 11 to the bidirectional switch 20 to the alternating-current power source PW. On the other hand, no current flows in the secondary winding 12.

Figure 6:
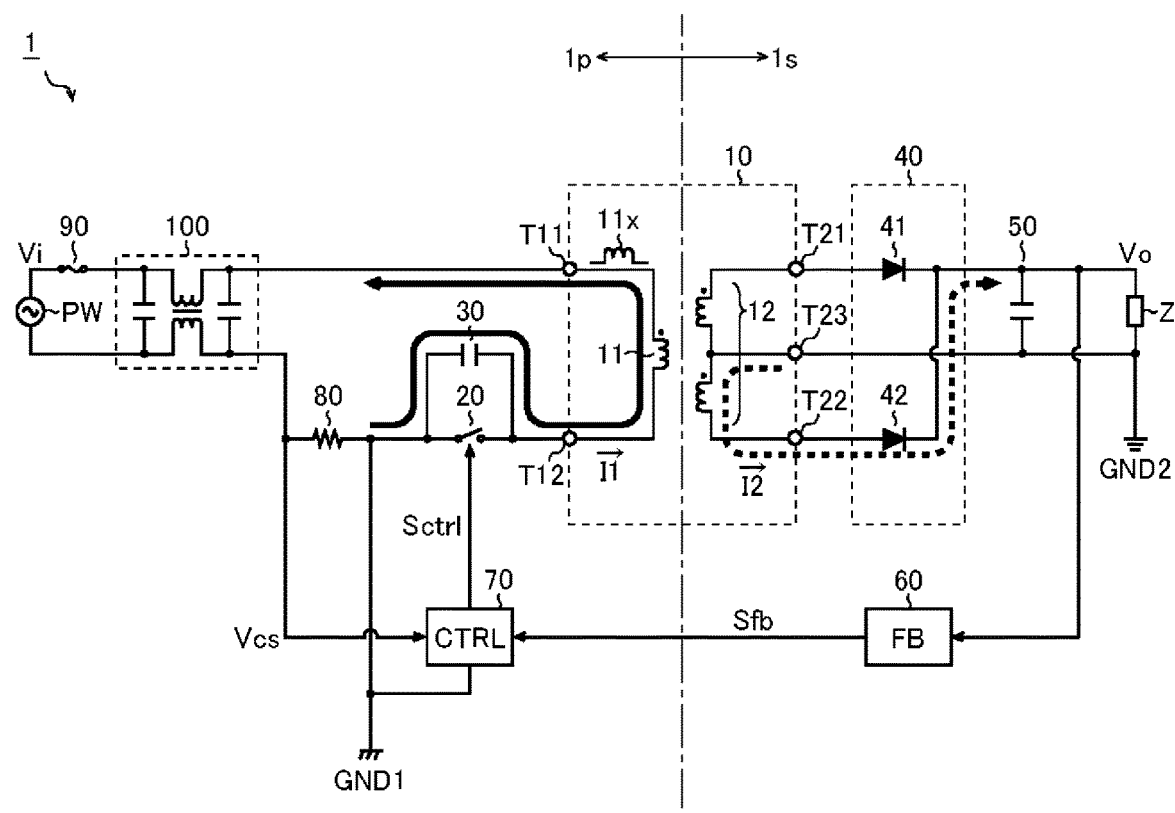
FIG. 6 is a circuit diagram showing a current path in a switch-off period in the first operation mode.

FIG. 6 is a circuit diagram showing the current path in a switch-off period in the first operation mode (flyback operation only). During the off-period of the bidirectional switch 20, an induced voltage (here referred to as a flyback voltage) appears in the secondary winding 12 which is magnetically coupled with the primary winding 11, and thus a secondary current I2 flows in the secondary circuit system 1s. For example, when the alternating-current input voltage Vi is positive (T11>T12) and energy is stored in the primary winding 11, as indicated by a thick broken-line arrow in the diagram, the secondary current I2 flows in the direction from the secondary winding 12 (second tap T22) to the diode 42 to the load Z to the secondary winding 12 (center tap T23).

When the bidirectional switch 20 is turned off, LLC resonance involving the resonance capacitor 30 occurs in the primary circuit system 1p. As a result, as indicated by a thick solid-line arrow in the diagram, a primary current I1 flows in the direction opposite to that in the preceding switch-on period.

Figure 7:
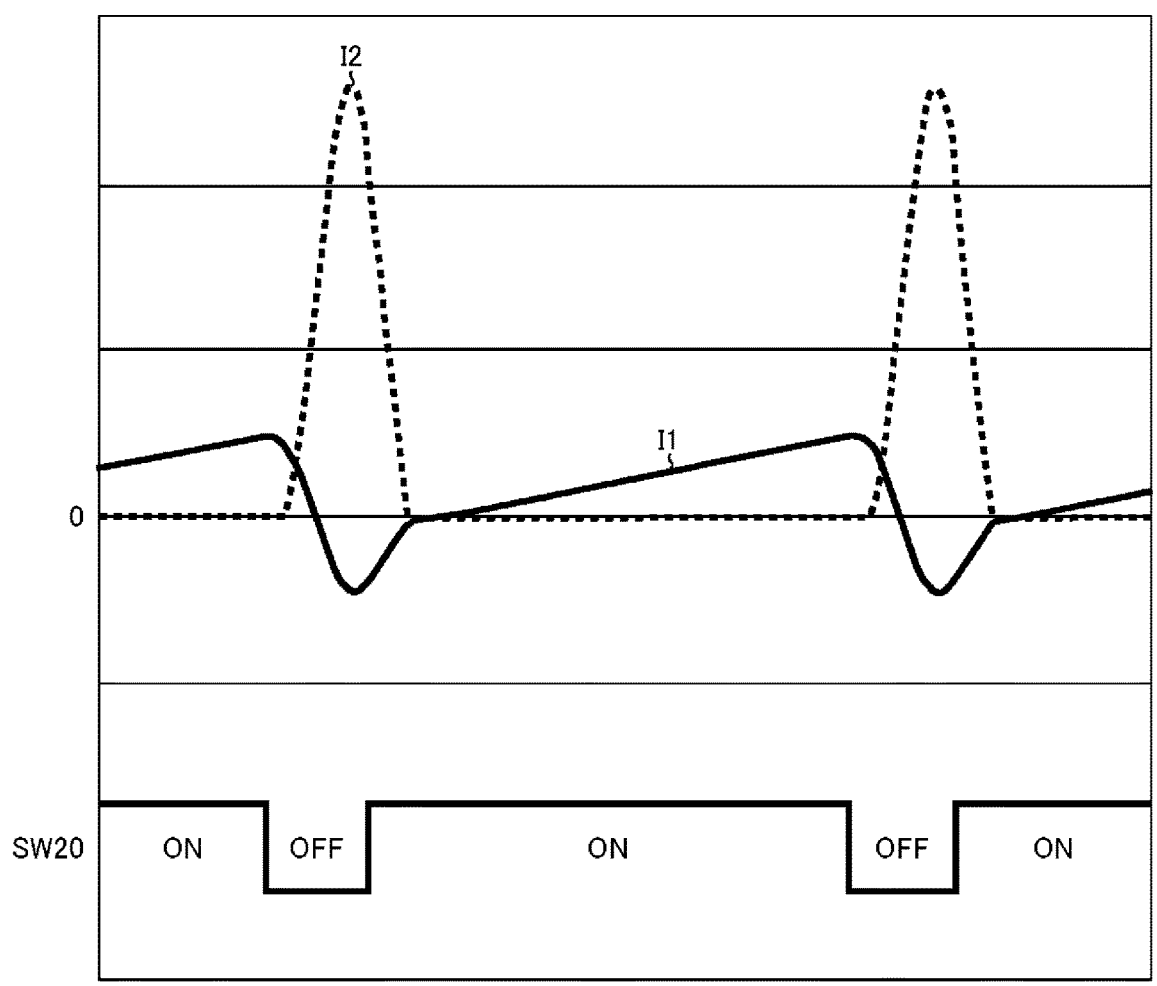
FIG. 7 is a waveform diagram showing current behavior in the first operation mode.

FIG. 7 is a waveform diagram showing the current behavior in the first operation mode (flyback operation only). A solid line represents the primary current I1, and a broken line represents the secondary current I2. The diagram shows the current behavior observed when the alternating-current input voltage Vi is positive (T11>T12).

As shown in the diagram, while the bidirectional switch 20 is on, the primary current I1 increases linearly with a positive gradient commensurate with the inductance of the primary winding 11. Thereafter, when the bidirectional switch 20 is turned off, the primary current I1 starts to decrease, until it eventually starts flowing in the negative direction.

On the other hand, no secondary current I2 flows while the bidirectional switch 20 is on; when the bidirectional switch 20 is turned off, the secondary current I2 jumps up greatly. Thus, in the first operation mode, as in conventional flyback operation, the crest value of the secondary current I2 is comparatively high. This, however, does not pose a serious problem because, as shown in FIG. 4 referred to previously, the AC-DC converter 1 operates in the first operation mode only during the period where −Vth<Vi<+Vth.

Figure 8:
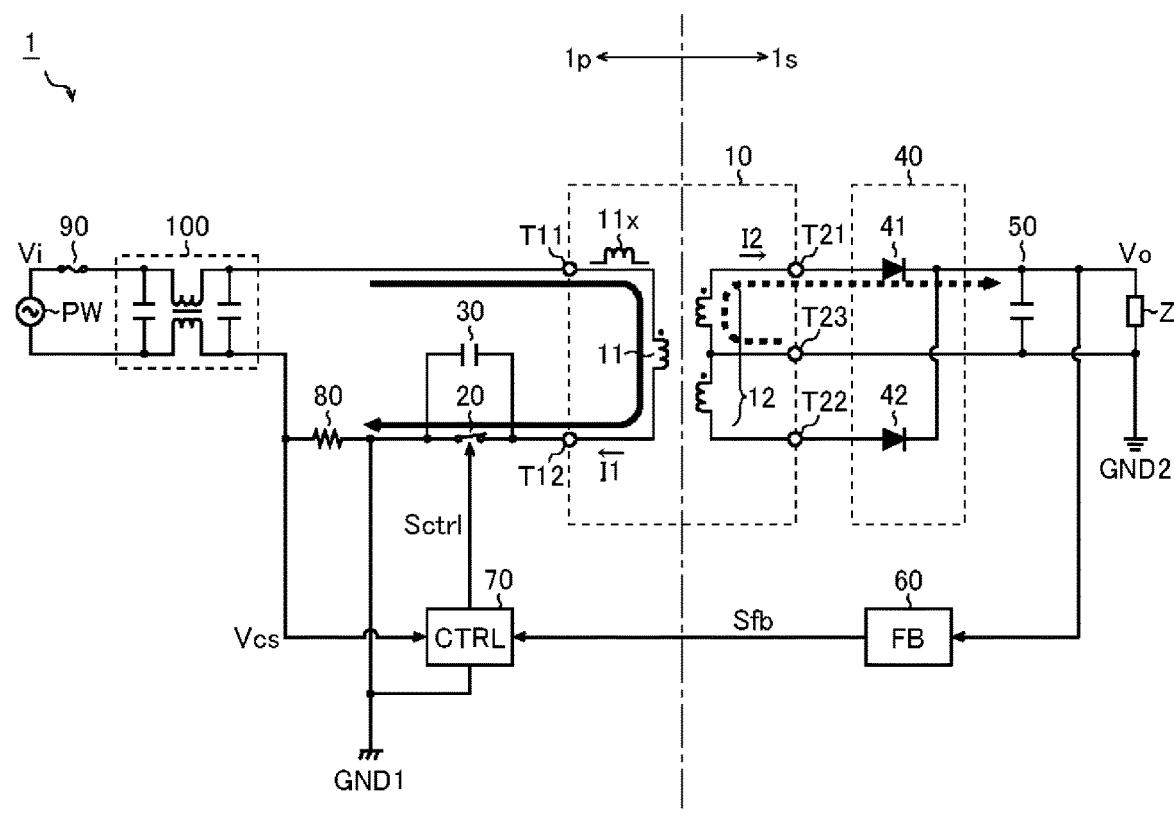
FIG. 8 is a circuit diagram showing a current path in a switch-on period in a second operation mode.

FIG. 8 is a circuit diagram showing the current path in a switch-on period in the second operation mode (flyback operation and forward operation combined). During the on-period of the bidirectional switch 20, as in the first operation mode, a primary current I1 flows in the primary circuit system 1p, and energy is stored in the primary winding 11. For example, when the alternating-current input voltage Vi is positive (T11>T12), as indicated by a thick solid-line arrow in the diagram, the primary current I1 flows in the direction from the alternating-current power source PW to the primary winding 11 to the bidirectional switch 20 to the alternating-current power source PW.

Moreover, in the second operation mode, during the on-period of the bidirectional switch 20, an induced voltage (here referred to as a forward voltage) appears in the secondary winding 12, and thus a secondary current I2 flows in the secondary circuit system 1s. Specifically, as indicated by a thick broken-line arrow in the diagram, the secondary current I2 flows in the direction from the secondary winding 12 (first tap T21) to the diode 41 to the load Z to the secondary winding 12 (center tap T23).

Figure 9:
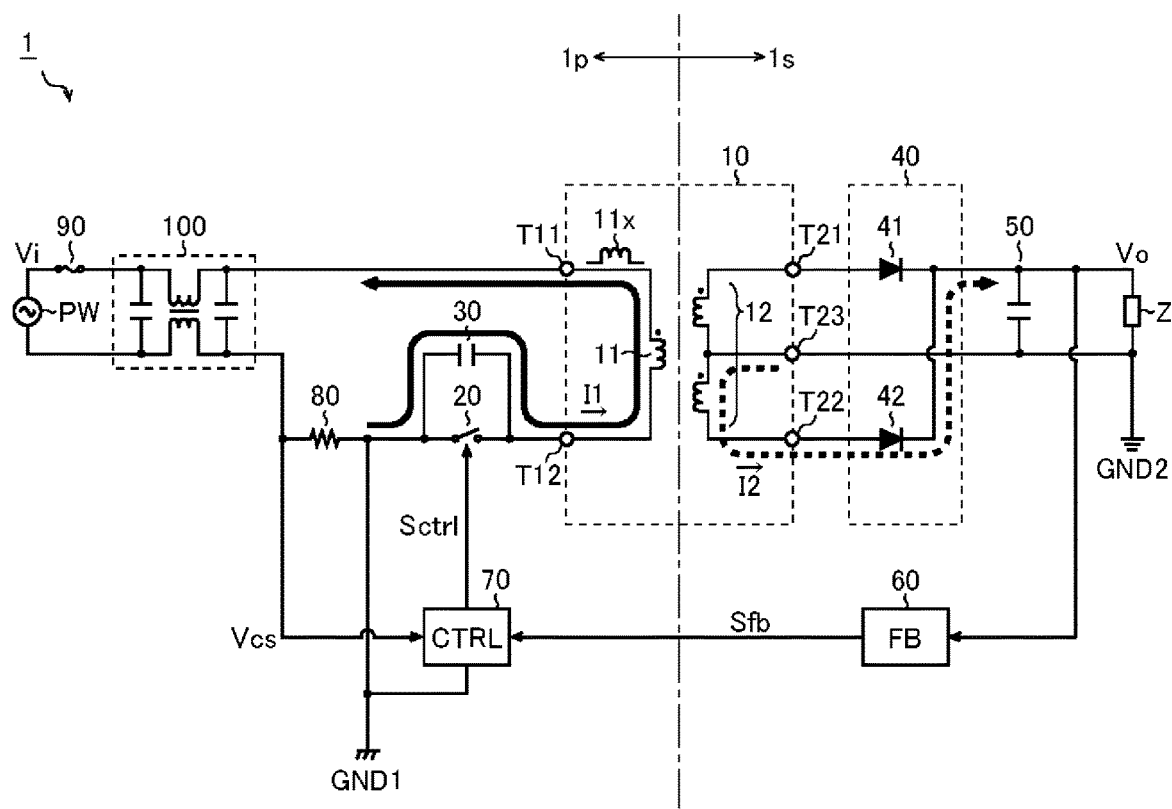
FIG. 9 is a circuit diagram showing a current path in a switch-off period in the second operation mode.

FIG. 9 is a circuit diagram showing the current path in a switch-off period in the second operation mode (flyback operation and forward operation combined). During the off-period of the bidirectional switch 20, as in the first operation mode, an induced voltage (that is, a flyback voltage) appears in the secondary winding 12 which is magnetically coupled with the primary winding 11, and thus a secondary current I2 flows in the secondary circuit system 1s. Specifically, as indicated by a thick broken-line arrow in the diagram, the secondary current I2 flows in the direction from the secondary winding 12 (second tap T22) to the diode 42 to the load Z to the secondary winding 12 (center tap T23).

When the bidirectional switch 20 is turned off, LLC resonance involving the resonance capacitor 30 occurs in the primary circuit system 1p. As a result, as indicated by a thick solid-line arrow in the diagram, a primary current I1 flows in the direction opposite to that in the preceding switch-on period.

Figure 10:
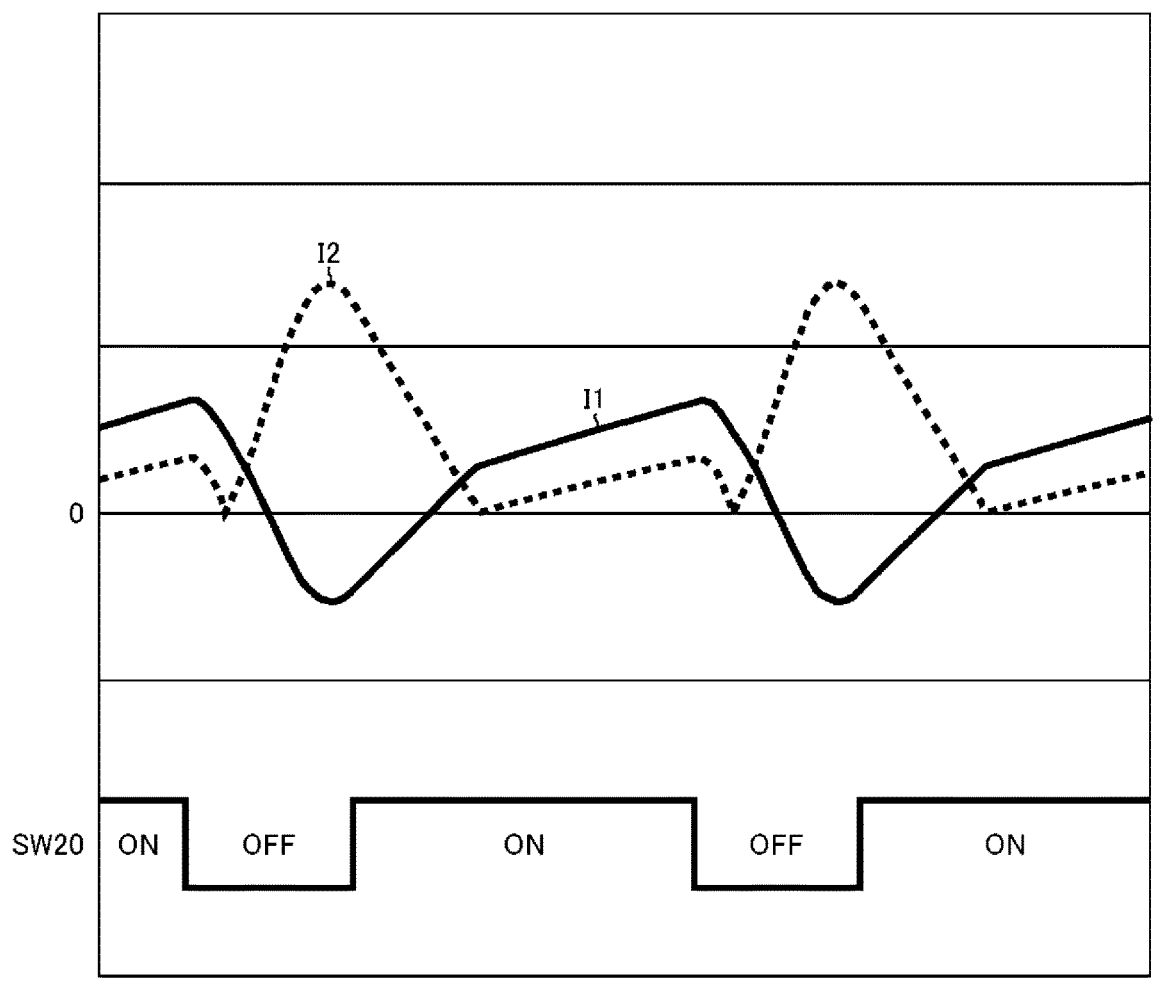
FIG. 10 is a waveform diagram showing current behavior in the second operation mode.

FIG. 10 is a waveform diagram showing the current behavior in the second operation mode (flyback operation and forward operation combined). As in FIG. 7 referred to previously, a solid line represents the primary current I1, and a broken line represents the secondary current I2. This diagram too shows the current behavior observed when the alternating-current input voltage Vi is positive (T11>T12).

As shown in the diagram, the behavior of the primary current I1 is basically the same as in the first operation mode (FIG. 7). Specifically, the primary current I1 flows in the positive direction during the on-period of the bidirectional switch 20, and flows in the negative direction in the off-period of the bidirectional switch 20.

On the other hand, the behavior of the secondary current I2 differs greatly from that in the first operation mode (FIG. 7) in that it flows not only during the on-period of the bidirectional switch 20 but also during the off-period of the bidirectional switch 20. Moreover, as a result of the secondary current I2 flowing during the on-period of the bidirectional switch 20, accordingly less energy is stored in the primary winding 11. Thus, as will be seen from the diagram, the crest value of the secondary current I2 observed when the bidirectional switch 20 is turned off is held low.

As described above, with the AC-DC converter 1, in which flyback operation and forward operation are used in combination, the forward voltage and the flyback voltage that appear in the secondary winding 12 can both be extracted as the output. It is thus possible to overcome the drawback of flyback operation, that is, a high crest value of the secondary current I2, and to achieve direct conversion of the alternating-current input voltage Vi to the direct-current output voltage Vo with high efficiency even in medium- to high-power applications.

First Embodiment

Figure 11:
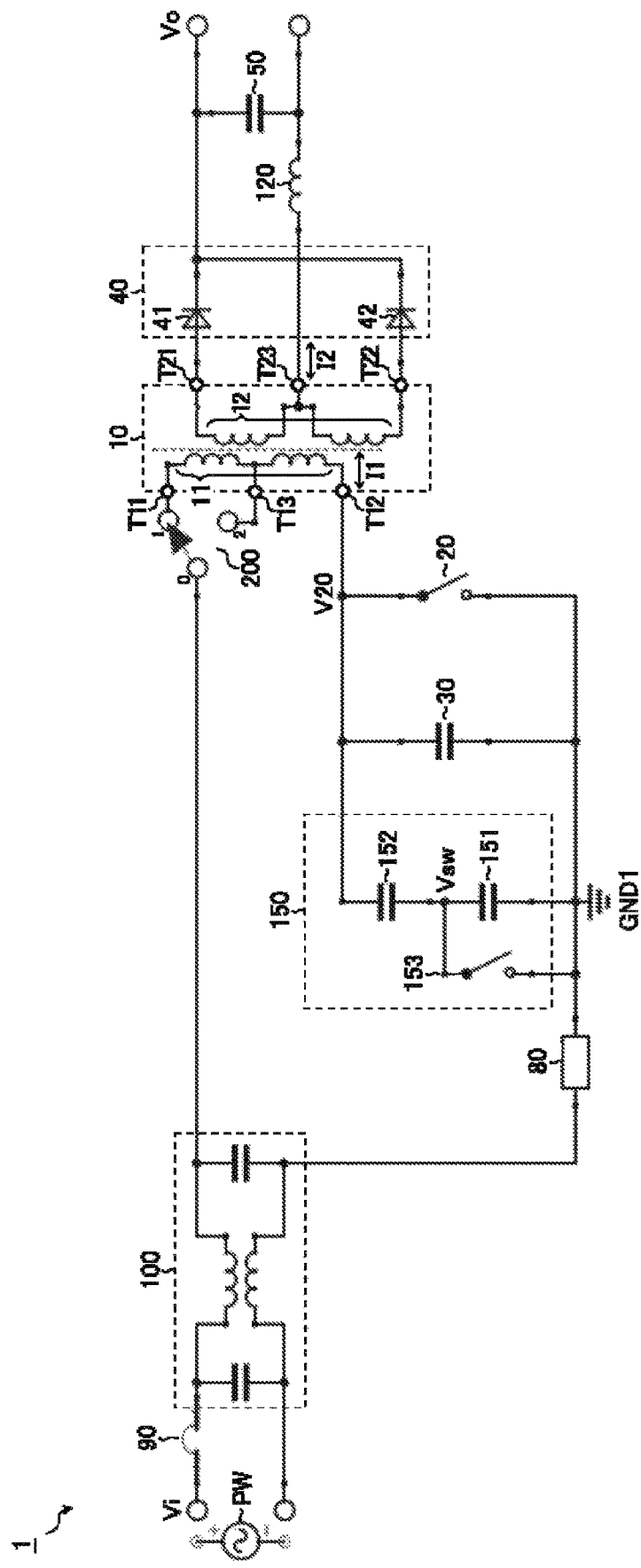
FIG. 11 is a circuit diagram of an AC-DC converter according to a first embodiment.

FIG. 11 is a circuit diagram of an AC-DC converter 1 according to a first embodiment. The AC-DC converter 1 of this embodiment is based on the previously described basic configuration (FIG. 1A) and involves some modifications. Accordingly, such constituent elements as are similar to those described previously are identified by the same reference signs as in FIG. 1A, and no overlapping description will be repeated; the following description focuses on features unique to this embodiment. It should be noted that, although omitted from illustration in FIG. 11, a feedback circuit 60 and a control circuit 70 are incorporated in the AC-DC converter 1.

First, as a chief modification from the basic configuration (FIG. 1), the AC-DC converter 1 of this embodiment includes a switch 200 for switching the number of turns of the primary winding 11. The switch 200 has one common node (0) and two selection nodes (1) and (2). Moreover, the primary winding 11 has a third tap T13 between the first and second taps T11 and T12.

Of the switch 200, the common node (0) is connected to an application terminal of the alternating-current input voltage Vi (that is, an output terminal of the filter circuit 100), the selection node (1) is connected to the first tap T11 of the primary winding 11, and the selection node (2) is connected to the third tap T13 of the primary winding 11. Thus, the switch 200 can switch which of the first and third taps T11 and T13 of the primary winding 11 to apply the alternating-current input voltage Vi to.

For example, in an application where a comparatively high alternating-current input voltage Vi (for example, Vi=AC 220 V) is fed in, the common node (0) and the selection node (1) of the switch 200 can be made to conduct to each other. Then, the winding ratio of the primary winding 11 to the secondary winding 12 equals n1:n2 (where n1 is the number of turns of the primary winding 11 from the first tap T11 to the second tap T12 and n2 is the number of turns of the secondary winding 12 from the first tap T21 to the second tap T22).

On the other hand, in an application where a comparatively low alternating-current input voltage Vi (for example, Vi=AC 100 V) is fed in, the common node (0) and the selection node (2) of the switch 200 can be made to conduct to each other. Then, the winding ratio of the primary winding 11 to the secondary winding 12 equals n1':n2 (where n1' is the number of turns of the primary winding 11 from the third tap T13 to the second tap T12, and n1>n1').

Switching the number of turns of the primary winding 11 in accordance with the alternating-current input voltage Vi as described above makes the on-period of the bidirectional switch 20 (and hence the switching frequency) less prone to vary even when the alternating-current input voltage Vi varies.

Thus, in coping with varying alternating-current input voltages Vi (to achieve what is called compatibility with multiple power sources), it is possible to use a common control circuit 70 (that is, controller IC) and to miniaturize the transformer 10 and peripheral components. It is thus possible to provide an easy-to-use, universal AC-DC converter 1 at low cost.

With the AC-DC converter 1 of this embodiment, the higher the alternating-current input voltage Vi is, the number of turns of the primary winding 11 can be increased so that the inductance value V can be increased. Accordingly, the higher the alternating-current input voltage Vi is, the Q value (quality factor, $\sqrt{(L/C)}$) of the resonant waveform which appears in the terminal-to-terminal voltage V20 across the bidirectional switch 20 is higher, and thus ZVS operation is easier.

As the switch 200, a manual switch may be used, or an electric switch such as a relay may be used. When the former is used, it is preferable to use as the transformer 10 itself one incorporating the switch 200 (that is, a transformer fitted with a tap changer). On the other hand, when the latter is used, it is preferable to adopt a configuration where the alternating-current input voltage Vi is monitored to switch the switch 200 automatically.

Next, as a second modification, in the AC-DC converter 1 of this embodiment, no leakage transformer or resonance transformer is used as the transformer 10; instead, between the center tap T23 of the secondary winding 12 and the secondary-side common GND2, a coil 120 is connected as a device that corresponds to a resonance inductance component (the previously described leakage inductance 11x).

Also with this configuration, it is possible to obtain effects and benefits similar to those obtained with the previously described basic configuration. It is thus possible to achieve direct conversion of the alternating-current input voltage Vi to the direct-current output voltage Vo with high efficiency even in medium- to high-power applications.

Moreover, with the AC-DC converter 1 of this embodiment, in the second operation mode (flyback operation and forward operation combined), it is possible to further reduce the secondary current I2 during the off-period of the bidirectional switch 20, and also to further increase the secondary current I2 during the on-period of the bidirectional switch 20.

In particular, with the AC-DC converter 1 of this embodiment, in the second operation mode (flyback operation and forward operation combined), the secondary current I2 during the on-period of the bidirectional switch 20 does not fall below 0 A. It is thus possible to operate the secondary circuit system is in a continuous current mode.

The coil 120 can be connected between the common node of the switch 200 and the output terminal of the filter circuit 100, or between the first tap T21 or the second tap T22 of the secondary winding 12 and the input terminal of the full-wave rectification circuit 40, or between the output terminal of the full-wave rectification circuit 40 and the output terminal of the direct-current output voltage Vo. However, according to a finding that resulted from simulations, to obtain the above-mentioned effects to the full, it is preferable that the coil 120 be connected between the center tap T23 of the secondary winding 12 and the secondary-side common GND2.

Next, as a third modification, the AC-DC converter 1 of this embodiment further includes a capacitance voltage-division circuit 150. The capacitance voltage-division circuit 150 capacitively divides the terminal-to-terminal voltage V20 across the bidirectional switch 20 to generate a division voltage Vsw. The capacitance voltage-division circuit 150 includes capacitors 151 and 152 and a discharge switch 153.

A first terminal of the capacitor 151 and a first terminal of the discharge switch 153 are both connected to the second terminal of the bidirectional switch 20 (that is, the primary-side common GND1, which corresponds to a reference potential terminal of the control circuit 70). A second terminal of the capacitor 151, a second terminal of the discharge switch 153, and a first terminal of the capacitor 152 are all connected to an output terminal of the division voltage Vsw. A second terminal of the capacitor 152 is connected to the first terminal of the bidirectional switch 20 (that is, the second tap T12 of the primary winding 11).

Thus, the capacitors 151 and 152 are connected in series with each other between the two terminals of the bidirectional switch 20, and output the division voltage Vsw from the connection node between them.

Let the capacitance value of the capacitor 151 be C151 and the capacitance value of the capacitor 152 be C152. Then, the division voltage Vsw is given by formula (4) below.

$$Vsw = V20 \times C152/(C151+C152) \quad (4)$$

Accordingly, by giving the capacitors 151 and 152 appropriate capacitance values such that C152<<C151, it is possible to generate the division voltage Vsw that falls within the input dynamic range of the control circuit 70.

During resonance operation of the AC-DC converter 1 (that is, when the bidirectional switch 20 is off), the terminal-to-terminal voltage V20 across the bidirectional switch 20 is generally so high as to exceed several hundred to one thousand volts. Thus, it is difficult to feed the terminal-to-terminal voltage V20 across the bidirectional switch 20 directly to the control circuit 70 for monitoring.

On the other hand, as mentioned above, the division voltage Vsw generated by the capacitance voltage-division circuit 150 can be set to falls within the input dynamic range of the control circuit 70, and thus can be fed directly to the control circuit 70.

In particular, the waveforms of the terminal-to-terminal voltage V20 and the division voltage Vsw are analogous to each other. Accordingly, by monitoring the division voltage Vsw in the control circuit 70, it is possible to properly detect the turning-on time of the bidirectional switch 20.

Moreover, with the capacitance voltage-division circuit 150 in this configuration example, no separate delay circuit is required owing to the disuse of resistors, which advance the phase of the detection signal. Nor is electric power lost in resistors.

Furthermore, the capacitance voltage-division circuit 150 in this configuration example is provided separately from the resonance capacitor 30, and thus allows the voltage division factor to be set freely irrespective of the capacitance value of the resonance capacitor 30.

The control circuit 70, which receives the division voltage Vsw, has a soft-switching function (that is, a ZVS function) whereby it watches for the division voltage Vsw to become equal to 0 V to turns on the bidirectional switch 20 at that time. With this soft-switching function, as mentioned earlier, it is possible to reduce the switching loss due to the parasitic capacitance of the bidirectional switch 20 and the resonance capacitor 30, and thus to enhance the conversion efficiency of the AC-DC converter 1.

The discharge switch 153 is connected in parallel with the capacitor 151. In accordance with the control signal Sctrl from the control circuit 70, the discharge switch 153 is turned on and off in synchronism with the bidirectional switch 20. More specifically, the discharge switch 153 is on during the on-period of the bidirectional switch 20, and is off during the off-period of the bidirectional switch 20.

Thus, with the capacitance voltage-division circuit 150 according to this embodiment, each time the bidirectional switch 20 is turned on, the capacitor 151 is short-circuited between its two terminals, so that the division voltage Vsw is initialized to 0 V. Accordingly, when the bidirectional switch 20 turns from on to off, the division voltage Vsw always changes starting at 0 V.

As a result, with the control circuit 70, it is possible to detect the zero-cross time of the division voltage Vsw (and hence the turning-on time of the bidirectional switch 20) with high accuracy by simply comparing the division voltage Vsw with a predetermined threshold voltage (0 V or a value close to it) with no regard whatever to an offset in the division voltage Vsw resulting from resonating operation.

Second Embodiment

Figure 12:
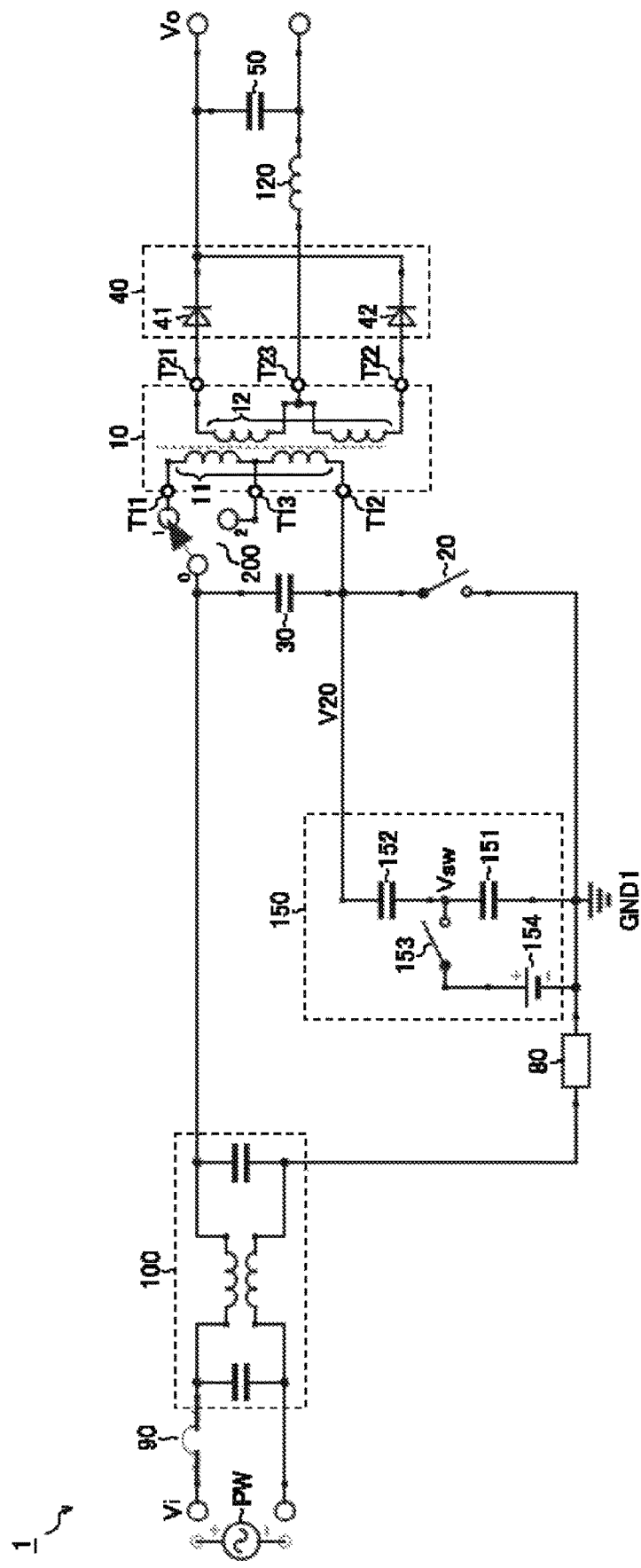
FIG. 12 is a circuit diagram of an AC-DC converter according to a second embodiment.

FIG. 12 is a circuit diagram of an AC-DC converter 1 according to a second embodiment. The AC-DC converter 1 of this embodiment is based on the previously described first embodiment (FIG. 11) and involves some modifications. Accordingly, such constituent elements as are similar to those described previously are identified by the same reference signs as in FIG. 11, and no overlapping description will be repeated; the following description focuses on features unique to this embodiment.

As a first modification, the resonance capacitor 30 is connected in parallel with the primary winding 11. This is analogous with the modification from what is shown in FIG. 1A to FIG. 1B. Instead, as in FIG. 1C, a resonance capacitor 30 may be connected in parallel with each of the bidirectional switch 20 and the primary winding 11.

As a second modification, the capacitance voltage-division circuit 150 further includes a voltage source 154 that is connected in series with the discharge switch 153. Introducing the voltage source 154 makes it possible to give a proper bias to the reference value of the division voltage Vsw (that is, the voltage value of the division voltage Vsw during the on-period of the bidirectional switch 20) with consideration given to the input dynamic range of the control circuit 70.

Third Embodiment

Figure 13:
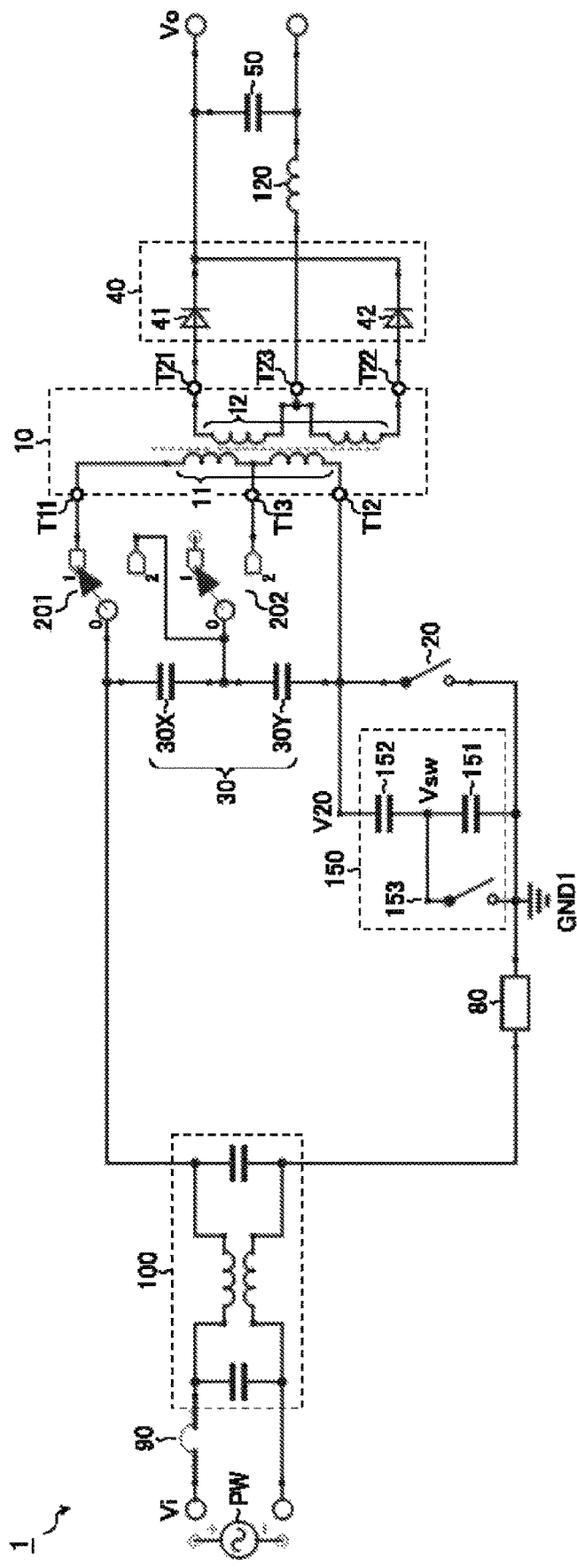
FIG. 13 is a circuit diagram of an AC-DC converter according to a third embodiment.

FIG. 13 is a circuit diagram of an AC-DC converter 1 according to a third embodiment. The AC-DC converter 1 of this embodiment is based on the previously described first and second embodiments (FIGS. 11 and 12) and is so configured that the number of turns of the primary winding 11 and the capacitance value of the resonance capacitor 30 are switched simultaneously. Accordingly, such constituent elements as are similar to those described previously are identified by the same reference signs as in FIG. 11, and no overlapping description will be repeated; the following description focuses on features unique to this embodiment.

To achieve simultaneous switching of the number of turns and the capacitance value as mentioned above, the AC-DC converter 1 of this embodiment includes, as the switch 200, switches 201 and 202, and includes, as the resonance capacitor 30, resonance capacitors 30X and 30Y (with capacitance values C30X and C30Y respectively).

Of the switch 201, a common node (0) is connected to the application terminal of the alternating-current input voltage Vi (the output terminal of the filter circuit 100) and a selection node (1) is connected to the first tap T11 of the primary winding 11. Of the switch 202, a common node is connected to a selection node (2) of the switch 201, a selection node (1) is left open, and a selection node (2) is connected to the third tap T13 of the primary winding 11.

The resonance capacitor 30X is connected between the common node (0) of the switch 201 and the common node (0) of the switch 202. The resonance capacitor 30Y is connected between the common node (0) of the switch 202 and the second tap T12 of the primary winding 11.

With this circuit configuration, it is possible to switch the number of turns of the primary winding 11 and the capacitance value of the resonance capacitor 30 simultaneously with the switches 201 and 202.

For example, in an application where a comparatively high alternating-current input voltage Vi (for example, Vi=AC 220 V) is fed in, the common node (0) and the selection node (1) of each of the switches 201 and 202 can be made to conduct to each other. Then, the winding ratio of the primary winding 11 to the secondary winding 12 equals n1:n2. The capacitance value of the resonance capacitor 30 equals C30X×C30Y/(C30X+C30Y).

On the other hand, in an application where a comparatively low alternating-current input voltage Vi (for example, Vi=AC 100 V) is fed in, the common node (0) and the selection node (2) of each of the switches 201 and 202 can be made to conduct to each other. Then, the winding ratio of the primary winding 11 to the secondary winding 12 equals n1':n2. The capacitance value of the resonance capacitor 30 equals C30Y.

By switching the number of turns of the primary winding 11 and the capacitance value of the resonance capacitor 30 simultaneously in accordance with the alternating-current input voltage Vi in this way, it is possible, in addition to obtaining the effects mentioned previously, to suppress the peak current (I=CV/T) that flows in the bidirectional switch 20 at start-up or when ZVS cannot be performed. It is thus possible to reduce the switching loss in the AC-DC converter 1.

Fourth Embodiment

Figure 14:
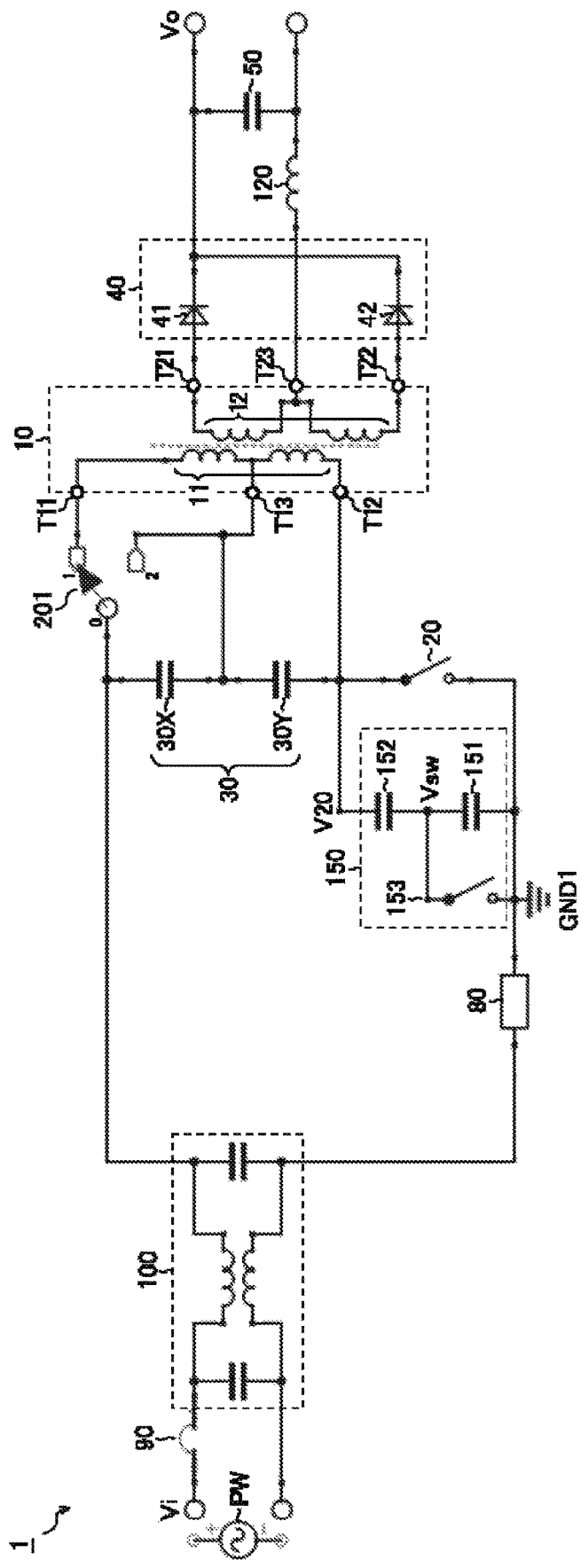
FIG. 14 is a circuit diagram of an AC-DC converter according to a fourth embodiment.

FIG. 14 is a circuit diagram of an AC-DC converter 1 according to a fourth embodiment. The AC-DC converter 1 of this embodiment is based on the previously described third embodiment (FIG. 13) and is characterized by the omission of the switch 202. Accordingly, such constituent elements as are similar to those described previously are identified by the same reference signs as in FIG. 13, and no overlapping description will be repeated; the following description focuses on features unique to this embodiment.

The omission of the switch 202 is coped with by modifying the interconnection among the switch 201 and the resonance capacitors 30X and 30Y. More specifically, of the switch 201, the common node (0) is connected to the application terminal of the alternating-current input voltage Vi (that is, the output terminal of the filter circuit 100), the selection node (1) is connected to the first tap T11 of the primary winding 11, and the selection node (2) is connected to the third tap T13 of the primary winding 11.

The resonance capacitor 30X is connected between the common node (0) of the switch 201 and the third tap T13 of the primary winding 11. The resonance capacitor 30Y is connected between the third and second taps T13 and T12 of the primary winding 11.

With this circuit configuration, it is possible to switch the number of turns of the primary winding 11 and the capacitance value of the resonance capacitor 30 simultaneously with only the switch 201.

For example, in an application where a comparatively high alternating-current input voltage Vi (for example, Vi=AC 220 V) is fed in, the common node (0) and the selection node (1) of the switch 201 can be made to conduct to each other. Then, the winding ratio of the primary winding 11 to the secondary winding 12 equals n1:n2. The capacitance value of the resonance capacitor 30 equals C30X× C30Y/(C30X+C30Y).

On the other hand, in an application where a comparatively low alternating-current input voltage Vi (for example, Vi=AC 100 V) is fed in, the common node (0) and the selection node (2) of the switch 201 can be made to conduct to each other. Then, the winding ratio of the primary winding 11 to the secondary winding 12 equals n1':n2. The capacitance value of the resonance capacitor 30 equals C30Y.

As described above, with the AC-DC converter 1 of this embodiment, it is possible, even with the switch 201 omitted, to obtain effects and benefits similar to those obtained with the previously described third embodiment (FIG. 13). It is thus possible to achieve size reduction and cost reduction in the AC-DC converter 1.

However, in the AC-DC converter 1 of this embodiment, the connection node between the resonance capacitors 30X and 30Y remains short-circuited to the third tap T13 all the time. Thus, the capacitance ratio of the resonance capacitor 30X to the resonance capacitor 30Y has to be adjusted properly so as not to hinder resonating operation. More specifically, it is preferable to make C30X:C30Y=n1":n1' (where n1" represents the number of turns of the primary winding 11 from the first tap T11 to the third tap T13).

Fifth Embodiment

Figure 15:
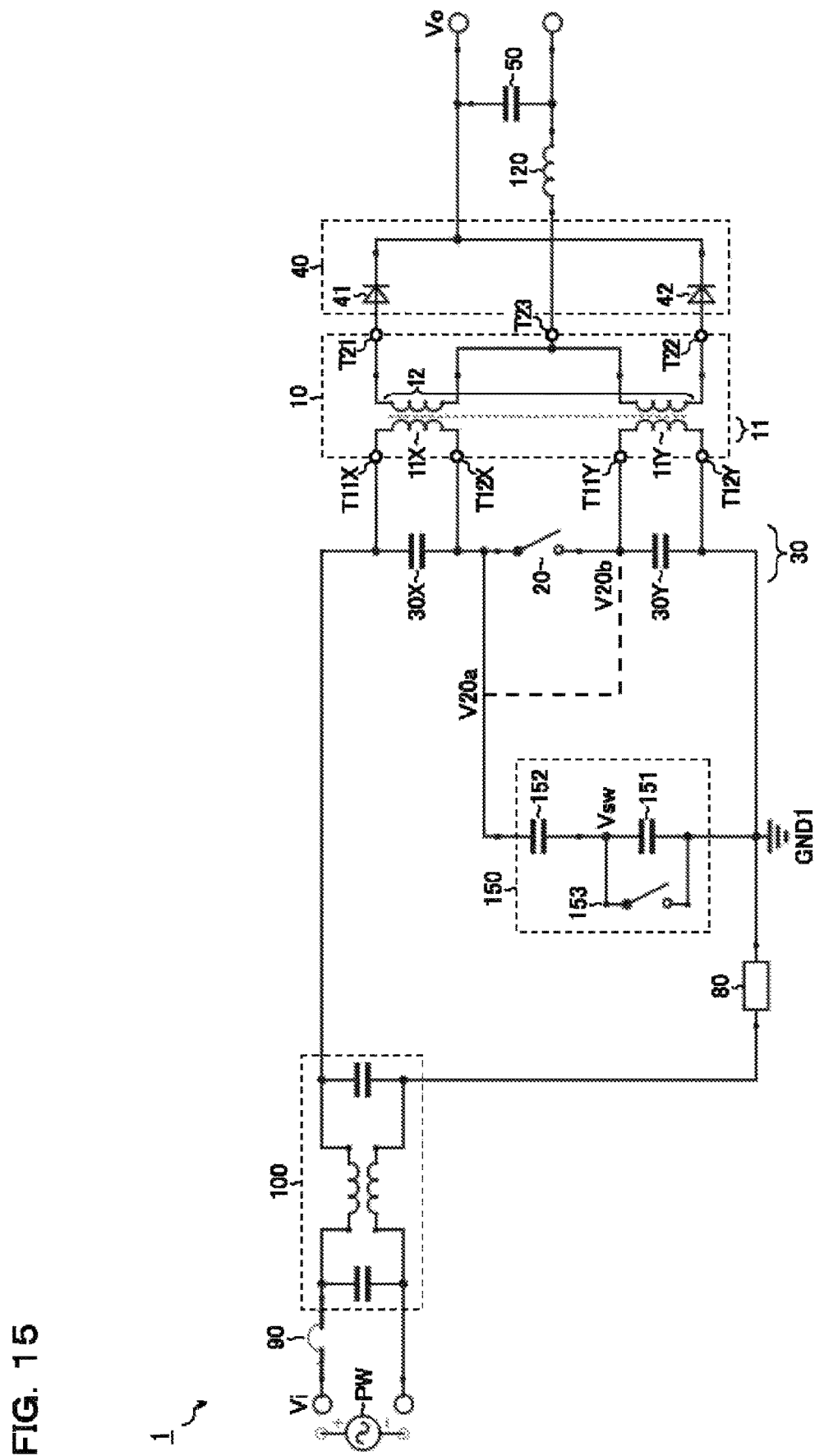
FIG. 15 is a circuit diagram of an AC-DC converter according to a fifth embodiment.

FIG. 15 is a circuit diagram of an AC-DC converter 1 according to a fifth embodiment. The AC-DC converter 1 of this embodiment is based on the previously described basic configuration (FIG. 1A) and involves some modifications. Accordingly, such constituent elements as are similar to those described previously are identified by the same reference signs as in FIG. 1A, and no overlapping description will be repeated; the following description focuses on features unique to this embodiment.

First, as a chief modification from the basic configuration (FIG. 1), the AC-DC converter 1 of this embodiment includes, as the primary winding 11, primary windings 11X and 11Y, and includes, as the resonance capacitor 30, resonance capacitors 30X and 30Y.

A first tap T11X of the primary winding 11X is connected to the application terminal of the alternating-current input voltage Vi (that is, the output terminal of the transformer 10). A second tap T12X of the primary winding 11X is connected to the first terminal of the bidirectional switch 20. A first tap T11Y of the primary winding 11Y is connected to the second terminal of the bidirectional switch 20. A second tap T12Y of the primary winding 11Y is connected to the primary-side common GND1. Thus, the bidirectional switch 20 is connected between the primary windings 11X and 11Y.

The secondary winding 12 is magnetically coupled with both of the primary windings 11X and 11Y via a common core. That is, in the AC-DC converter 1 of this embodiment, the primary windings 11X and 11Y and the secondary winding 12 are included in a single transformer 10.

The resonance capacitor 30X is connected in parallel with the primary winding 11X between the first and second taps T11X and T12X of the primary winding 11X. The resonance capacitor 30Y is connected in parallel with the primary winding 11Y between the first and second taps T11Y and T12Y of the primary winding 11Y.

The windings and the resonance capacitors on the primary side, specifically, the primary winding 11X and the resonance capacitor 30X at one end and the primary winding 11Y and the resonance capacitor 30Y at the other end, are arranged symmetrically about the bidirectional switch 20.

The capacitance voltage-division circuit 150 can be connected either to the first terminal side of the bidirectional switch 20 (that is, to the second tap T12X of the primary winding 11X) or to the second terminal side of the bidirectional switch 20 (that is, to the first tap T11Y of the primary winding 11Y) (see the long-stroke broken line).

With this circuit configuration, it is possible to effectively reduce the switching noise resulting from the on/off operation of the bidirectional switch 20. The principle of noise reduction will now be described with reference to a diagram.

Figure 16:
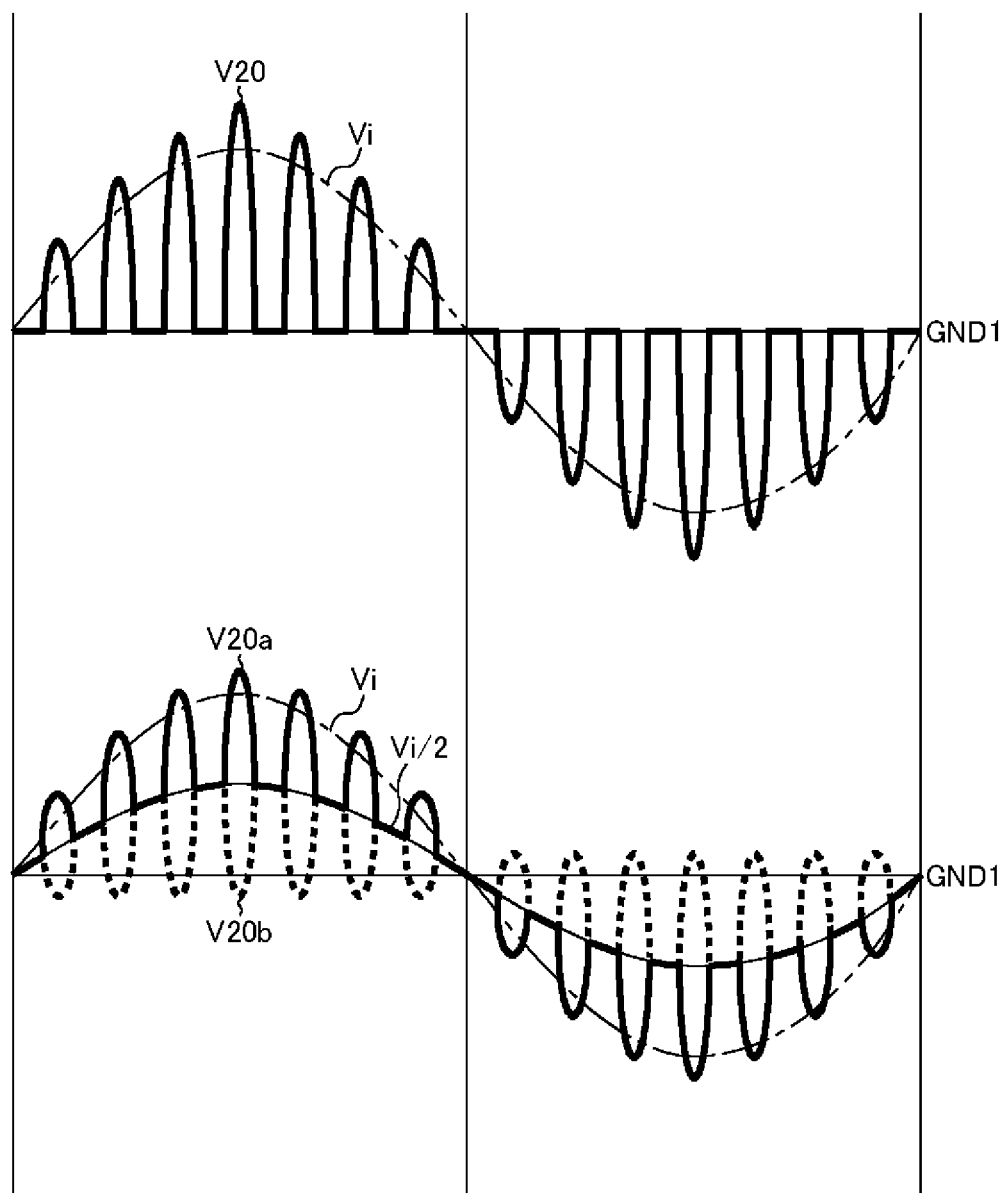
FIG. 16 is a diagram illustrating the principle of noise reduction.

FIG. 16 is a diagram illustrating the principle of noise reduction. In the upper tier of the diagram is depicted the terminal-to-terminal voltage V20 that appears across the bidirectional switch 20 in the previously described basic configuration (FIG. 1A). On the other hand, in the lower tier of the diagram are depicted a node voltage V20a (solid line) that appears at the first terminal (on the primary winding 11X side) of the bidirectional switch 20 and a node voltage V20b (broken line) that appears at the second terminal (on the primary winding 11Y side) of the bidirectional switch 20.

The following description assumes that the resonance capacitors 30X and 30Y are given equal capacitance values such that, when the bidirectional switch 20 is on, V20a=V20b=Vi/2 (hereinafter referred to as the midpoint voltage).

For example, in the previously described basic configuration (FIG. 1A), when the bidirectional switch 20 is turned from on to off, if Vi>0, the terminal-to-terminal voltage V20 swings in the positive direction relative to the primary-side common GND1 as a reference value; if Vi<0, the terminal-to-terminal voltage V20 swings in the negative direction relative to the primary-side common GND1 as a reference value.

In contrast, in this embodiment, when the bidirectional switch 20 is turned from on to off, if Vi>0, the node voltage V20a swings in the positive direction relative to the midpoint voltage Vi/2 as a reference value and simultaneously the node voltage V20b swings in the negative direction relative to the midpoint voltage Vi/2 as a reference value; if Vi<0, quite the opposite occurs: the node voltage V20a swings in the negative direction relative to the midpoint voltage Vi/2 as a reference value and simultaneously the node voltage V20b swings in the positive direction relative to the midpoint voltage Vi/2 as a reference value.

That is, the resonant waveforms of the node voltages V20a and V20b are analogous to each other, being symmetrical in the positive and negative directions. Thus, the switching noise appearing in the node voltages V20a and V20b respectively as a result of resonating operation cancels each other. This is considered to be extremely effective as a measure against EMI (electromagnetic interference).

Moreover, with the AC-DC converter 1 of this embodiment, it is possible to suppress the peak current that flows when the bidirectional switch 20 turns on.

Furthermore, with the AC-DC converter 1 of this embodiment, if only the node voltages V20a and V20b both return to the midpoint voltage Vi/2, the bidirectional switch 20 can perform ZVS operation. It is thus possible to perform ZVS operation more easily and more reliably than with the previously described basic configuration (FIG. 1A).

In the AC-DC converter 1 of this embodiment, as other modifications from the basic configuration (FIG. 1A), a coil 120 and a capacitance voltage-division circuit 150 are provided additionally. Since these modifications have already been discussed in connection with the previously described first embodiment (FIG. 11), no overlapping explanation will be repeated.

Sixth Embodiment

Figure 17:
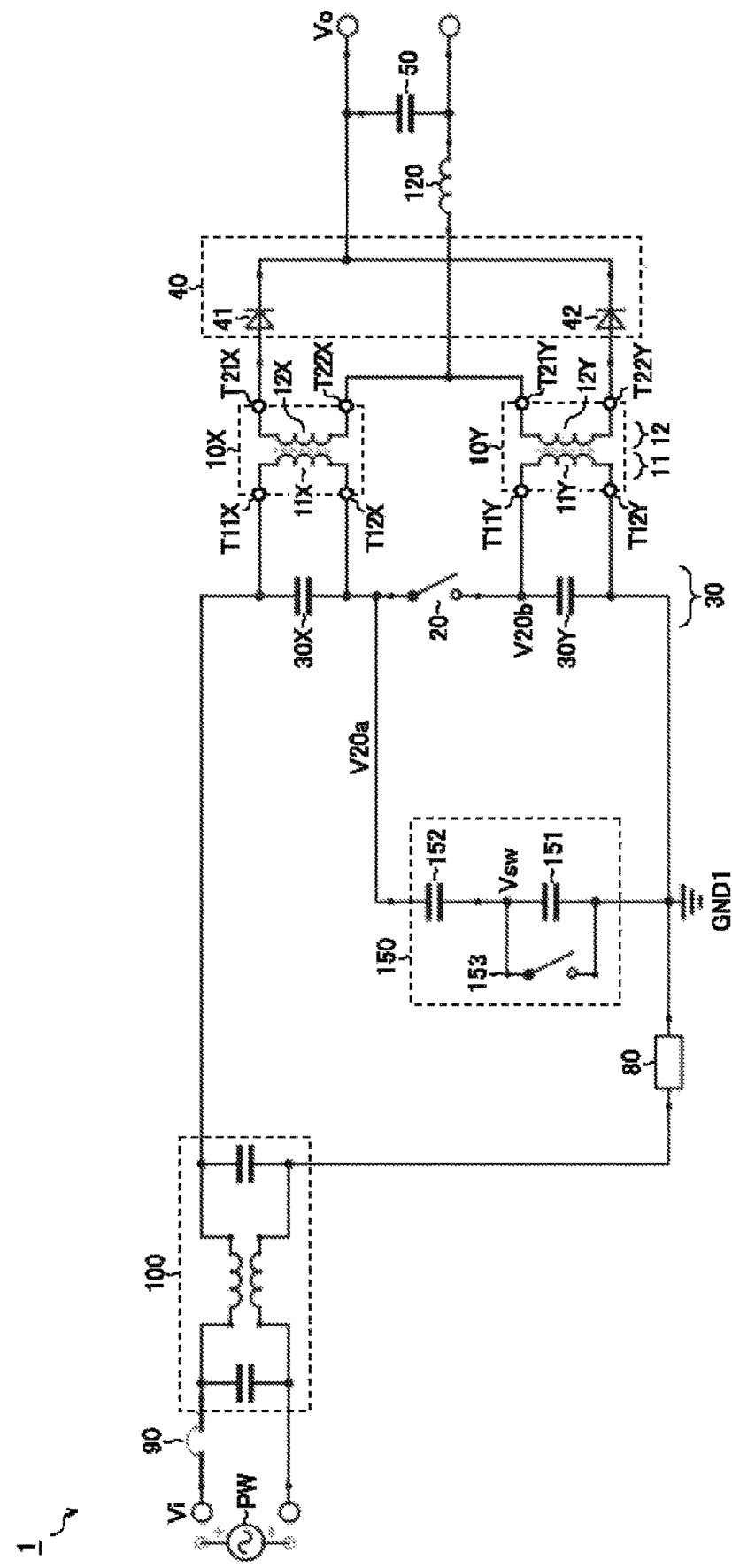
FIG. 17 is a circuit diagram of an AC-DC converter according to a sixth embodiment.

FIG. 17 is a circuit diagram of an AC-DC converter 1 according to a sixth embodiment. The AC-DC converter 1 of this embodiment is based on the previously described fifth embodiment (FIG. 15) and is modified in that the transformer 10 is divided into transformers 10X and 10Y. More specifically, the transformer 10X includes a primary winding 11X and a secondary winding 12X magnetically coupled with it. On the other hand, the transformer 10Y includes a primary winding 11Y and a secondary winding 12Y magnetically coupled to it. In this way, instead of a single transformer 10, a plurality of transformers 10X and 10Y can be used.

Seventh Embodiment

Figure 18:
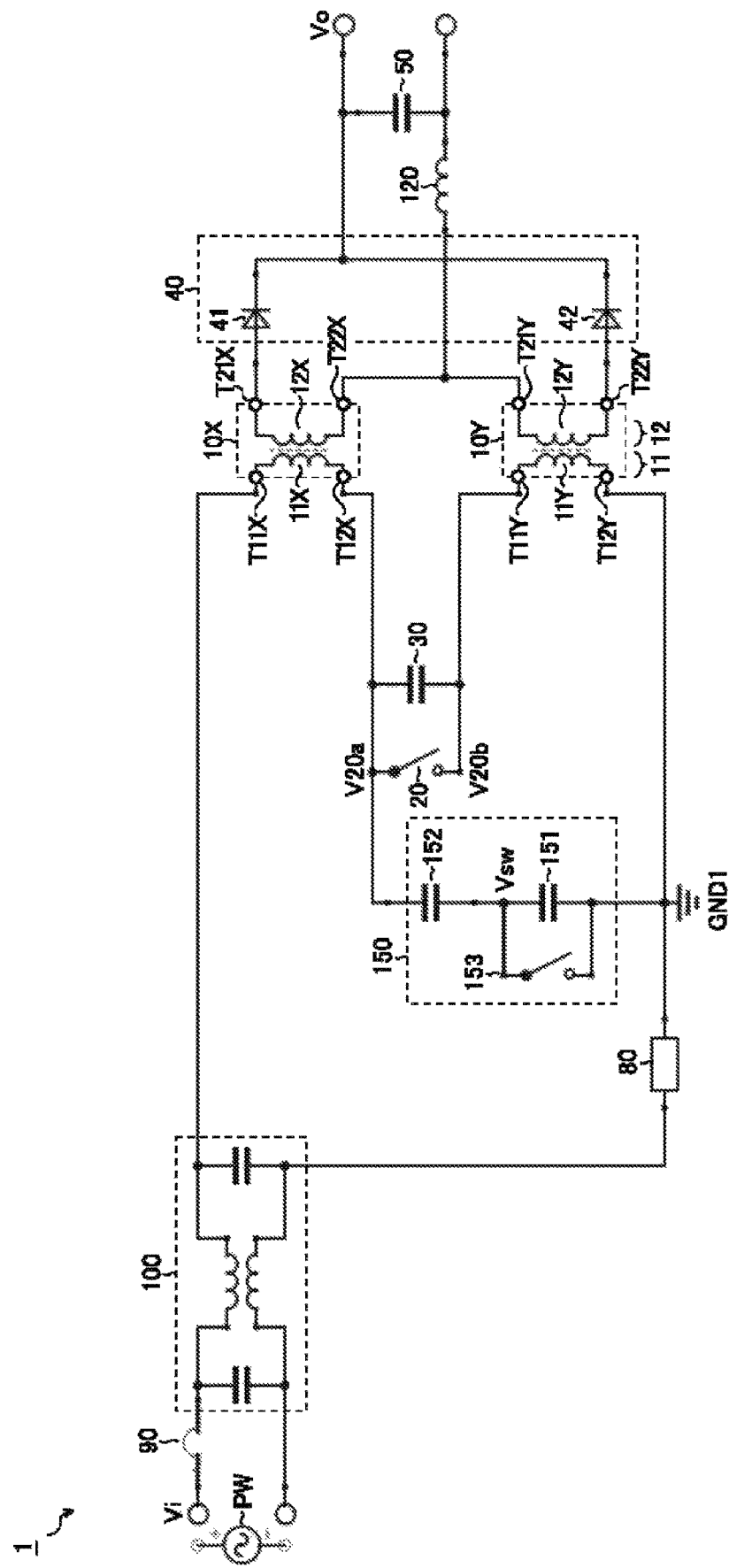
FIG. 18 is a circuit diagram of an AC-DC converter according to a seventh embodiment.

FIG. 18 is a circuit diagram of an AC-DC converter 1 according to a seventh embodiment. The AC-DC converter 1 of this embodiment is based on the previously described sixth embodiment (FIG. 17) and is modified in that the resonance capacitor 30 is connected in parallel with the bidirectional switch 20. In this way, the resonance capacitor 30 does not necessarily have to be connected in parallel with the primary windings 11X and 11Y, but can be connected in parallel with the bidirectional switch 20.

Eighth Embodiment

Figure 19:
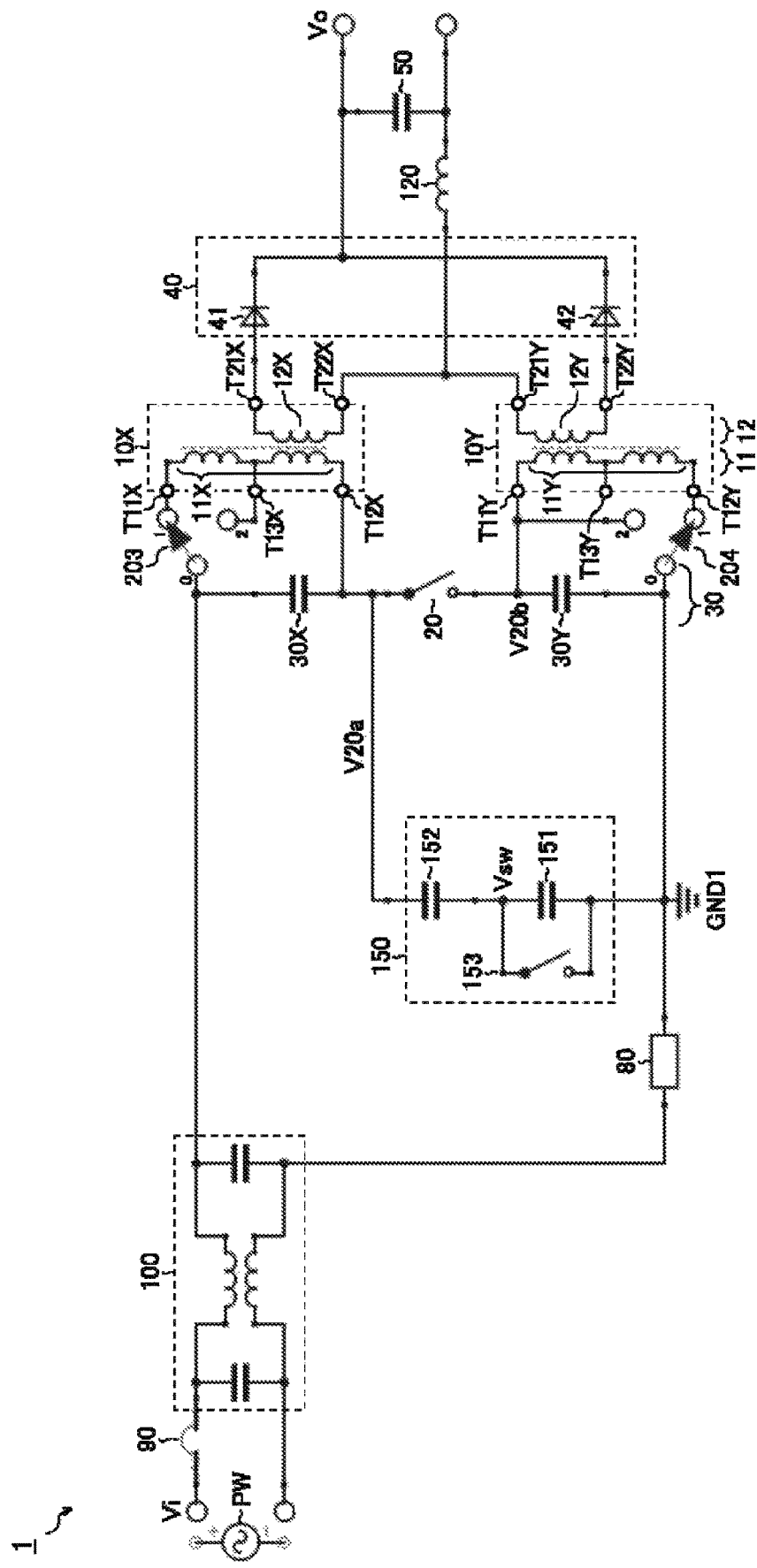
FIG. 19 is a circuit diagram of an AC-DC converter according to an eighth embodiment.

FIG. 19 is a circuit diagram of an AC-DC converter 1 according to an eighth embodiment. The AC-DC converter 1 of this embodiment is a combination of the first to fourth embodiments (FIGS. 11 to 14) and the fifth to seventh embodiments (FIGS. 15 to 18), and can be said to have a configuration where, for example, with the sixth embodiment (FIG. 17) taken as the basis, the primary windings 11X and 11Y are provided with third taps T13X and T13Y respectively, and switches 203 and 204 are additionally provided.

The first tap T11x of the primary winding 11X is connected to the selection node (1) of the switch 203. The second tap T12X of the primary winding 11X is connected to the first terminal of the bidirectional switch 20. The third tap T13X of the primary winding 11X is connected to the selection node (2) of the switch 203. The common node (0) of the switch 203 is connected to the application terminal of the alternating-current input voltage Vi (that is, the output terminal of the filter circuit 100).

The first tap T11Y of the primary winding 11Y is connected to the second terminal of the bidirectional switch 20 and to the selection node (2) of the switch 204. The second tap T12Y of the primary winding 11Y is connected to the selection node (1) of the switch 204. The third tap T13Y of the primary winding 11Y is left open. Thus, the third tap T13Y does not necessarily have to be provided. The common node (0) of the switch 204 is connected to the primary-side common GND1.

The resonance capacitor 30X is connected between the common node (0) of the switch 203 and the second tap T12X of the primary winding 11X. On the other hand, the resonance capacitor 30Y is connected between the first tap T11Y of the primary winding 11Y and the common node (0) of the switch 204.

With this circuit configuration, it is possible to switch the number of turns of the primary winding 11 and the capacitance value of the resonance capacitor 30 simultaneously with the switches 203 and 204.

For example, in an application where a comparatively high alternating-current input voltage Vi (for example, Vi=AC 220 V) is fed in, the common node (0) and the selection node (1) of each of the switches 203 and 204 can be made to conduct to each other. Then, the winding ratio of the primary winding 11 to the secondary winding 12 equals N1:N2 (where N1 represents the sum of the number of turns of the primary winding 11X from the first tap T11X to the second tap T12X and the number of turns of the primary winding 11Y from the first tap T11Y to the second tap T12Y, and N2 represents the sum of the number of turns of the secondary winding 12X from the first tap T21X to the second tap T22X and the number of turns of the secondary winding 12Y from the first tap T21Y to the second tap T22Y. The capacitance value of the resonance capacitor 30 equals C30X×C30Y/(C30X+C30Y).

On the other hand, in an application where a comparatively low alternating-current input voltage Vi (for example, Vi=AC 100 V) is fed in, the common node (0) and the selection node (2) of each of the switches 203 and 204 can be made to conduct to each other. Then, the winding ratio of the primary winding 11 to the secondary winding 12 equals N1':N2 (where N1' is the number of turns of the primary winding 11X from the third tap T13X to the second tap T12X, and N1>N1'). The capacitance value of the resonance capacitor 30 equals C30Y.

As described above, with the AC-DC converter 1 of this embodiment, it is possible to switch the number of turns of the primary winding 11 in accordance with the alternating-current input voltage Vi. Thus, as with the previously described first to fourth embodiments (FIGS. 11 to 14), it is possible to cope with varying alternating-current input voltages Vi.

In particular, with the AC-DC converter 1 of this embodiment, it is possible to switch the number of turns of the primary winding 11 and the capacitance value of the resonance capacitor 30 simultaneously. Thus, as with the previously described third and fourth embodiments (FIGS. 13 and 14), it is possible to suppress the peak current at start-up or when ZVS cannot be performed. It is thus possible to reduce the switching loss in the AC-DC converter 1.

Moreover, with the AC-DC converter 1 of this embodiment, owing to the bidirectional switch 20 being connected in series between the primary windings 11X and 11Y, as with the previously described fifth to seventh embodiments (FIGS. 15 to 18), it is possible to obtain the effect of reducing switching noise.

Ninth Embodiment

Figure 20:
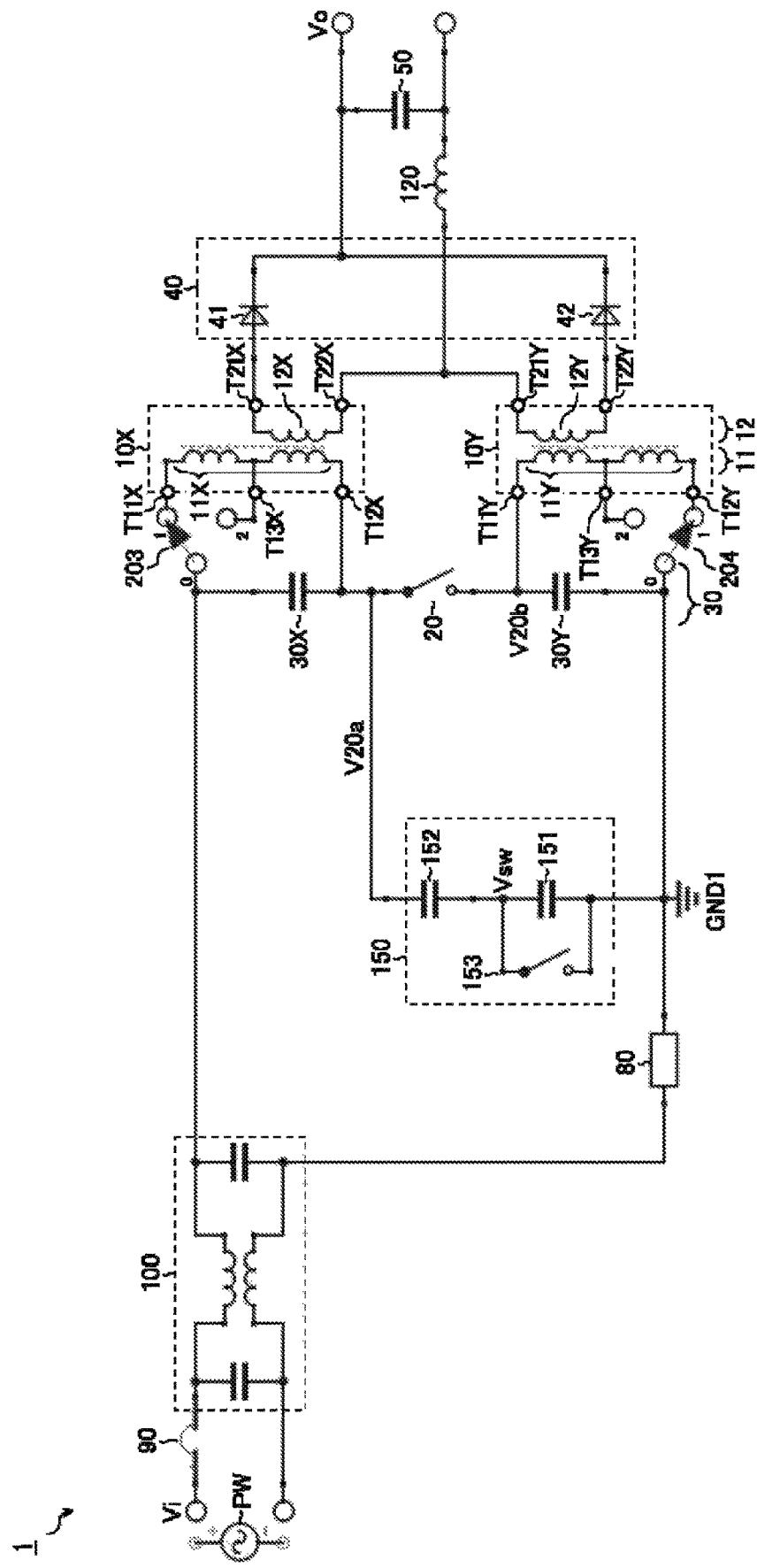
FIG. 20 is a circuit diagram of an AC-DC converter according to a ninth embodiment.

FIG. 20 is a circuit diagram of an AC-DC converter 1 according to a ninth embodiment. The AC-DC converter 1 of this embodiment is based on the previously described eighth embodiment (FIG. 19) and involves a modification in the connection of the switch 204.

More specifically, of the switch 204, the selection node (2) is connected to the third tap T13Y of the primary winding 11Y. With this modification, it is possible to switch only the number of turns of the primary winding 11 by using the switches 203 and 204.

For example, in an application where a comparatively high alternating-current input voltage Vi (for example, Vi=AC 220 V) is fed in, the common node (0) and the selection node (1) of each of the switches 203 and 204 can be made to conduct to each other. Then, the winding ratio of the primary winding 11 to the secondary winding 12 equals N1:N2. The capacitance value of the resonance capacitor 30 equals C30X×C30Y/(C30X+C30Y).

On the other hand, in an application where a comparatively low alternating-current input voltage Vi (for example, Vi=AC 100 V) is fed in, the common node (0) and the selection node (2) of each of the switches 203 and 204 can be made to conduct to each other. Then, the winding ratio of the primary winding 11 to the secondary winding 12 equals N1":N2 (where N1" is the sum of the number of turns of the primary winding 11X from the third tap T13X to the second tap T12X and the number of turns of the primary winding 11Y from the first tap T11Y to the third tap T13Y, and N1>N1"). The capacitance value of the resonance capacitor 30 equals, as in the above-mentioned case, C30X×C30Y/(C30X+C30Y).

Tenth Embodiment

Figure 21:
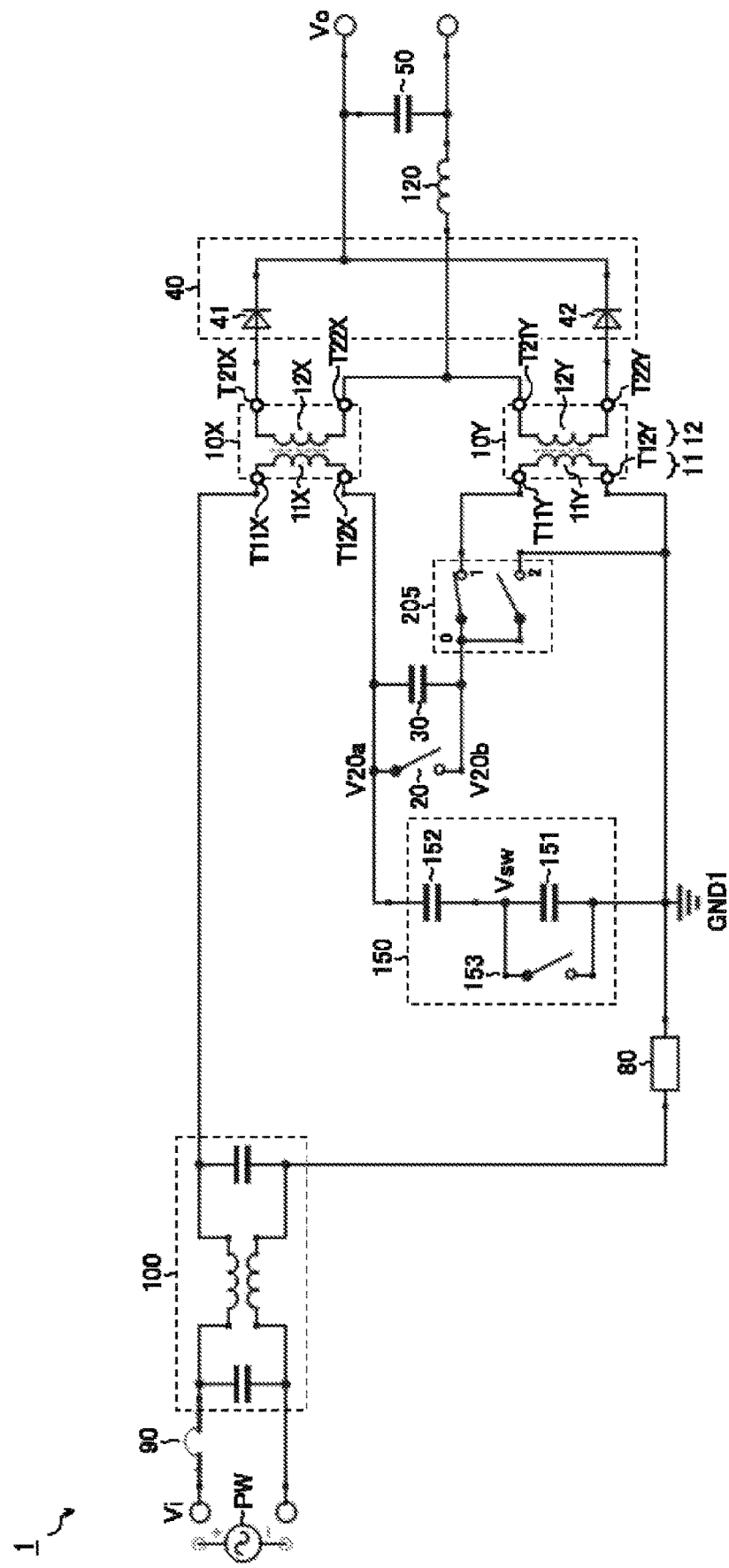
FIG. 21 is a circuit diagram of an AC-DC converter according to a tenth embodiment.

FIG. 21 is a circuit diagram of an AC-DC converter 1 according to a tenth embodiment. The AC-DC converter 1 of this embodiment, like the previously described eighth and ninth embodiments (FIGS. 19 and 20), is a combination of the first to fourth embodiments (FIGS. 11 to 14) and the fifth to seventh embodiments (FIGS. 15 to 18), and can be said to have a configuration where, for example, with the seventh embodiment (FIG. 18) taken as the basis, a switch 205 is additionally provided.

Of the switch 205, a common node (0) is connected to the second terminal of the bidirectional switch (that is, the application terminal of the node voltage V20b), a selection node (1) is connected to the first tap T11Y of the primary winding 11Y, and a selection node (2) is connected to the second tap T12Y of the primary winding 11Y.

With this circuit configuration, it is possible to switch the number of turns of the primary winding 11 by using the switch 205.

For example, in an application where a comparatively high alternating-current input voltage Vi (for example, Vi=AC 220 V) is fed in, the common node (0) and the selection node (1) of the switch 205 can be made to conduct to each other. Then, the winding ratio of the primary winding 11 to the secondary winding 12 equals N1:N2.

On the other hand, in an application where a comparatively low alternating-current input voltage Vi (for example, Vi=AC 100 V) is fed in, the common node (0) and the selection node (2) of the switch 205 can be made to conduct to each other. Then, the winding ratio of the primary winding 11 to the secondary winding 12 equals N1''':N2 (where N1''' is the number of turns of the primary winding 11 from the first tap T11X to the second tap T12X, and N1>N1''').

In particular, with the AC-DC converter 1 according to this embodiment, it is possible to obtain effects and benefits similar to that obtained with the previously described ninth embodiment (FIG. 20) by using a single switch 205.

Eleventh Embodiment

Figure 22:
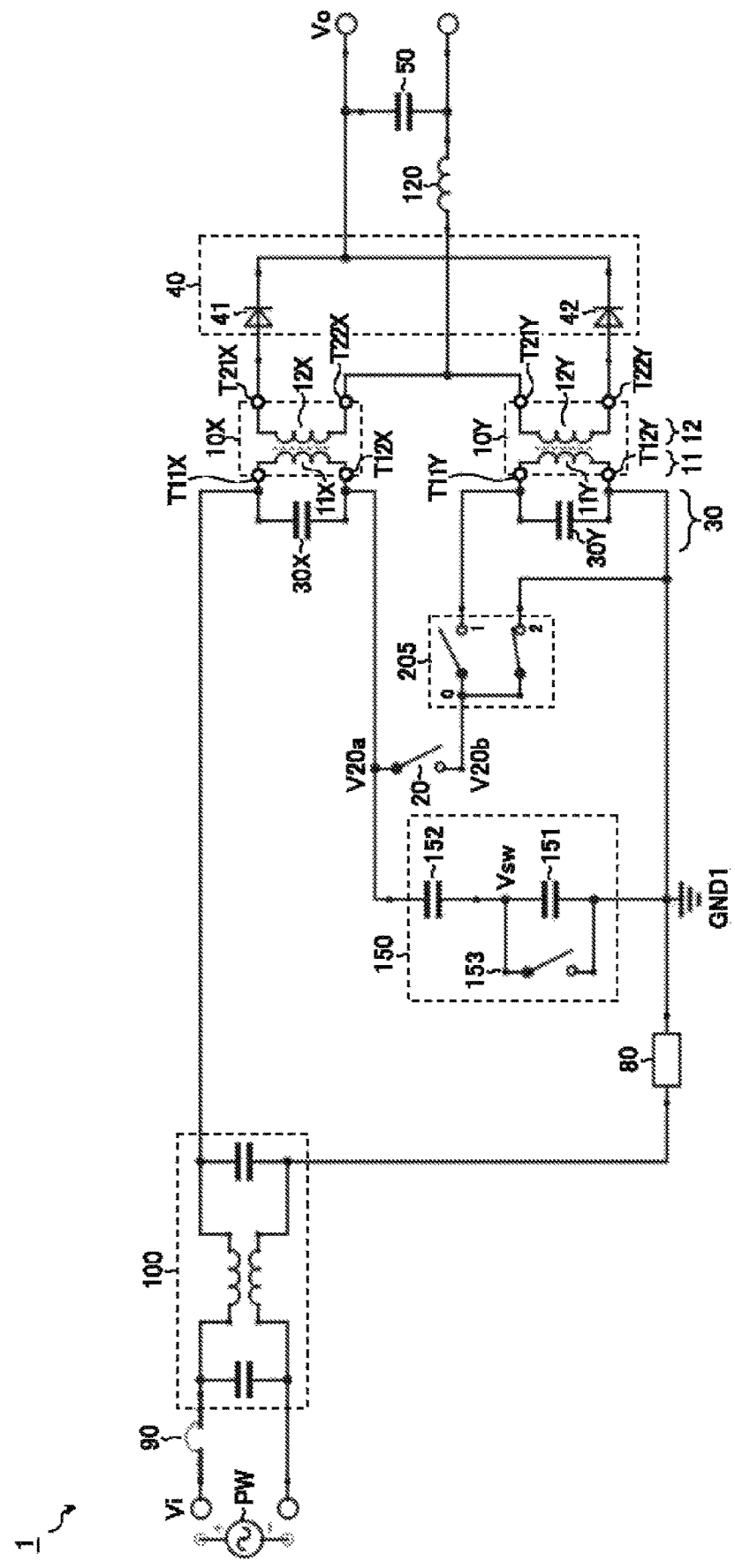
FIG. 22 is a circuit diagram of an AC-DC converter according to an eleventh embodiment.

FIG. 22 is a circuit diagram of an AC-DC converter 1 according to an eleventh embodiment. The AC-DC converter 1 of this embodiment is based on the previously described tenth embodiment (FIG. 21) and is modified to include, as the resonance capacitor 30, resonance capacitors 30X and 30Y. The resonance capacitors 30X and 30Y are connected in parallel with the primary windings 11X and 11Y respectively.

With this circuit configuration, it is possible to switch the number of turns of the primary winding 11 and the capacitance value of the resonance capacitor 30 simultaneously by using the switch 205.

For example, in an application where a comparatively high alternating-current input voltage Vi (for example, Vi=AC 220 V) is fed in, the common node (0) and the selection node (1) of the switch 205 can be made to conduct to each other. Then, the winding ratio of the primary winding 11 to the secondary winding 12 equals N1:N2. The capacitance value of the resonance capacitor 30 equals C30X×C30Y/(C30X+C30Y).

On the other hand, in an application where a comparatively low alternating-current input voltage Vi (for example, Vi=AC 100 V) is fed in, the common node (0) and the selection node (2) of the switch 205 can be made to conduct to each other. Then, the winding ratio of the primary winding 11 to the secondary winding 12 equals N1''':N2, and the capacitance value of the resonance capacitor 30 equals C30X.

In particular, with the AC-DC converter 1 of this embodiment, it is possible to obtain effects and benefits similar to those obtained with the previously described eighth embodiment (FIG. 19) by using a single switch 205.

Twelfth Embodiment

Figure 23:
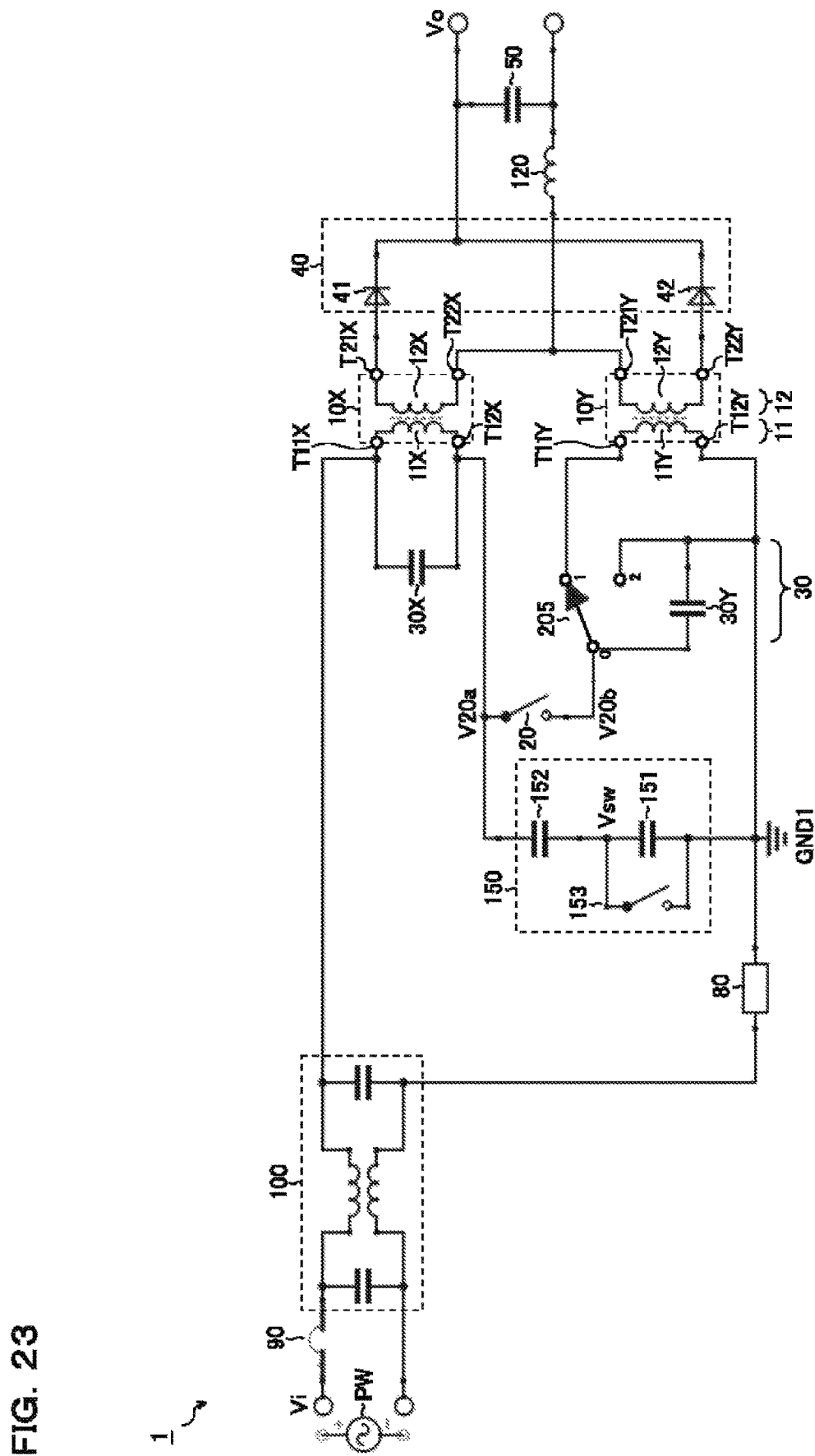
FIG. 23 is a circuit diagram of an AC-DC converter according to a twelfth embodiment.

FIG. 23 is a circuit diagram of an AC-DC converter 1 according to a twelfth embodiment. The AC-DC converter 1 of this embodiment is based on the previously described eleventh embodiment (FIG. 22) and involves a slight modification in the connection position of the resonance capacitor 30Y.

Specifically, the resonance capacitor 30Y is connected between the common node (0) of the switch 205 and the third tap T13Y of the primary winding 11Y. Even with this modification, it is possible to switch the number of turns of the primary winding 11 and the capacitance value of the resonance capacitor 30 simultaneously by using the switch 205.

For example, in an application where a comparatively high alternating-current input voltage Vi (for example, Vi=AC 220 V) is fed in, the common node (0) and the selection node (1) of the switch 205 can be made to conduct to each other. Then, the winding ratio of the primary winding 11 to the secondary winding 12 equals N1:N2, and the capacitance value of the resonance capacitor 30 equals C30X×C30Y/(C30X+C30Y).

On the other hand, in an application where a comparatively low alternating-current input voltage Vi (for example, Vi=AC 100 V) is fed in, the common node (0) and the selection node (2) of the switch 205 can be made to conduct to each other. Then, the winding ratio of the primary winding 11 to the secondary winding 12 equals N1''':N2, and the capacitance value of the resonance capacitor 30 equals C30X.

Thirteenth Embodiment

Figure 24:
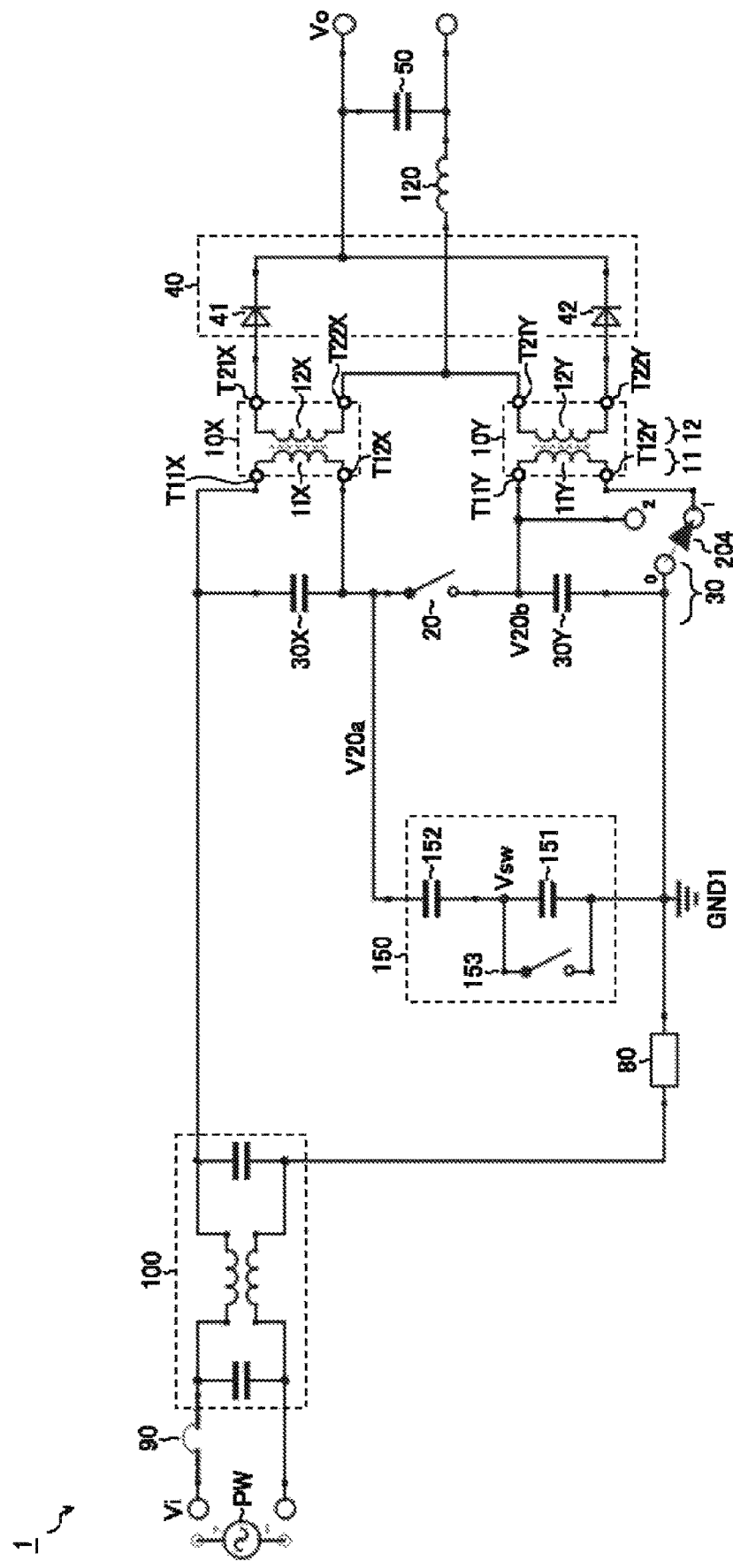
FIG. 24 is a circuit diagram of an AC-DC converter according to a thirteenth embodiment.

FIG. 24 is a circuit diagram of an AC-DC converter 1 according to a thirteenth embodiment. The AC-DC converter 1 of this embodiment is based on the previously described eighth embodiment (FIG. 19) and is modified in that the switch 203 is omitted. Specifically, the first tap T11X of the primary winding 11X is connected directly to the application terminal of the alternating-current input voltage Vi (that is, the output terminal of the filter circuit 100). Also with this modification, it is possible to switch the number of turns of the primary winding 11 and the capacitance value of the resonance capacitor 30 simultaneously by using the switch 205.

For example, in an application where a comparatively high alternating-current input voltage Vi (for example, Vi=AC 220 V) is fed in, the common node (0) and the selection node (1) of the switch 204 can be made to conduct to each other. Then, the winding ratio of the primary winding 11 to the secondary winding 12 equals N1:N2, and the capacitance value of the resonance capacitor 30 equals C30X×C30Y/(C30X+C30Y).

On the other hand, in an application where a comparatively low alternating-current input voltage Vi (for example, Vi=AC 100 V) is fed in, the common node (0) and the selection node (2) of the switch 204 can be made to conduct to each other. Then, the winding ratio of the primary winding 11 to the secondary winding 12 equals N1''':N2, and the capacitance value of the resonance capacitor 30 equals C30X.

Although the seventh to thirteenth embodiments (FIGS. 18 to 24) deal with configurations that use a plurality of transformers 10X and 10Y, it is also possible to make those transformers into a single transformer 10 by use of a shared core.

Fourteenth Embodiment

Figure 25:
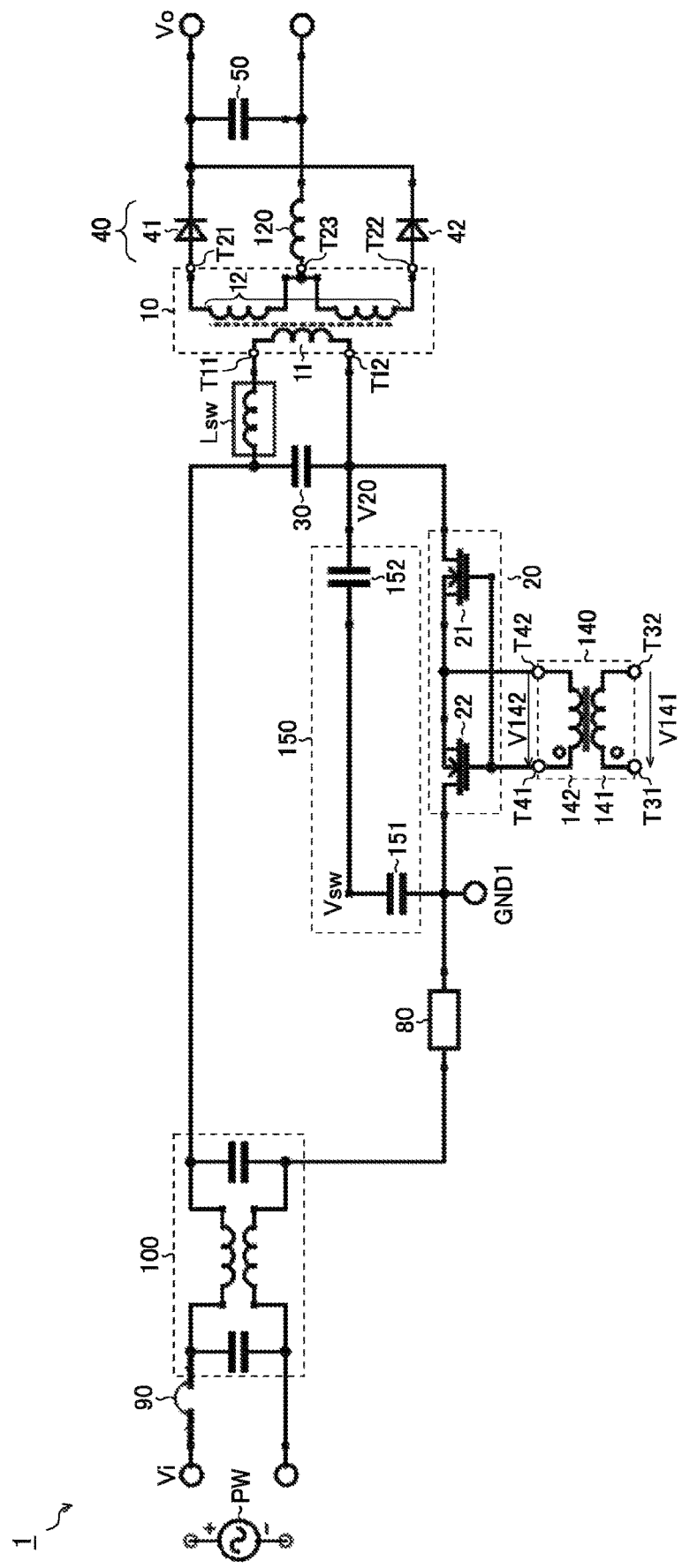
FIG. 25 is a circuit diagram of an AC-DC converter according to a fourteenth embodiment.

FIG. 25 is a circuit diagram of an AC-DC converter 1 according to a fourteenth embodiment. The AC-DC converter 1 of this embodiment, compared with the previously described basic configuration (FIG. 1B), further includes a capacitance voltage-division circuit 150 (in FIG. 11 etc.) and involves some additional modifications. Accordingly, such constituent elements as are similar to those described previously are identified by the same reference signs as in FIGS. 1B, 11, etc., and no overlapping description will be repeated; the following description focuses on features unique to this embodiment.

A first modification lies in that, as a resonance inductance component of the AC-DC converter 1, an inductor Lsw of a swinging (choke) type (such as an amorphous choke coil or a composite core type) is connected in series with the primary winding 11. As the transformer 10, it is possible to use one with a comparatively high coupling coefficient K (for example, K=0.9) or a resonance type with a comparatively low coupling coefficient K. The inductor Lsw can be omitted, in which case the leakage inductance 11x (see FIG. 1B etc.) of the transformer 10 can be used as a swinging (choke) type.

This configuration provides the following effects. The voltage amplitude across the resonance capacitor 30 is proportional to the current I that flows in the primary winding 11 of the transformer 10 and in the inductor Lsw and to the Q value ($\sqrt{(L/C)}$) of the resonant waveform appearing in the terminal-to-terminal voltage V20 across the bidirectional switch 20. Accordingly, introducing an inductor Lsw of a swinging (choke) type, of which the inductance L decreases as the current I increases, allows optimization of ZVS.

This helps reduce the ineffective current that flows in the primary winding 11 of the transformer 10, and thereby helps improve the efficiency of the AC-DC converter 1. It is also possible to lower the withstand voltage of the bidirectional switch 20 (transistors 21 and 22, which will be described later).

Figure 26:
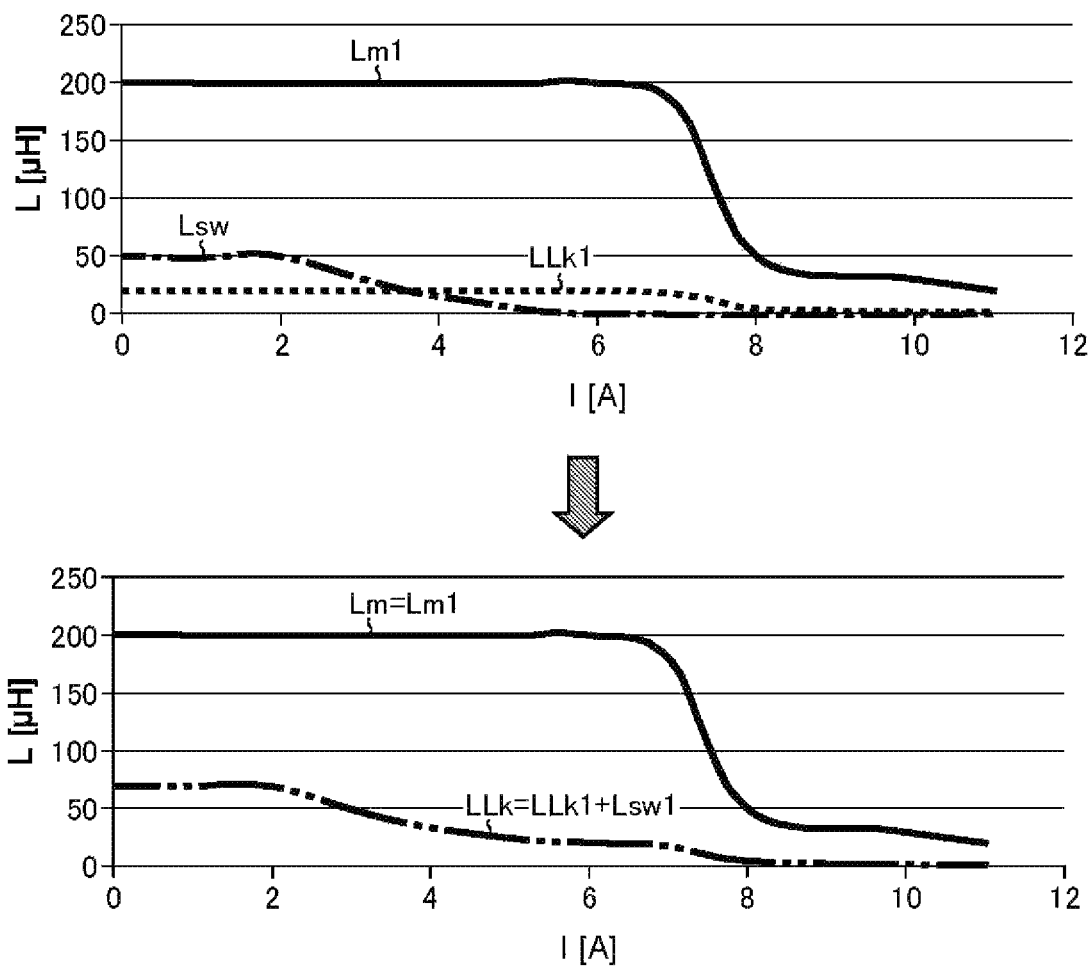
FIG. 26 is a diagram showing overall characteristics of a combination of a swinging choke with a transformer (resonant type)

FIG. 26 is a diagram showing the overall characteristics of a combination of a swinging choke with a transformer (resonant type), the horizontal axis representing current I (A), the vertical axis representing inductance L (µH). Depicted in the upper tier of the diagram are the exciting inductance Lm1 (solid line) of the transformer 10 (K=0.9), the leakage inductance LLk1 (broken line), and the inductance Lsw (dash-dot line) of the swinging choke. On the other hand, depicted in the lower tier of the diagram are the exciting inductance Lm=Lm1 (solid line) of the transformer 10 and the combined inductance LLk=LLk1+Lsw (dash-dot-dot line).

As will be understood from the diagram, for the inductance Lsw of the swinging choke and the combined inductance LLk, in a range of current of I=2 A to 8 A, as the current flowing in the relevant elements increases, the respective inductance values L decrease. As mentioned above, the voltage amplitude of the resonance capacitor 30 is kept constant as a result of, despite the current I increasing, the leakage inductance decreasing and hence the Q value decreasing. In a region where the current I is low, the leakage inductance increases, and thus the voltage amplitude of the resonance capacitor 30 does not decrease, and this helps perform ZVS easily.

A second modification lies in that the bidirectional switch 20 is driven via a pulse transformer 140. In this configuration example, the bidirectional switch 20 includes N-channel MOS field-effect transistors 21 and 22. The control circuit 70 (not shown in the diagram) drives the transistors 21 and 22 (and hence the bidirectional switch 20) via the pulse transformer 140. The pulse transformer 140 includes a primary winding 141 and a secondary winding 142, the latter being magnetically coupled with the former with the same polarity. A first tap T31 and a second tap T32 of the primary winding 141 are individually connected to the control circuit 70 (not shown in the diagram).

A drain of the transistor 21 corresponds to the first terminal of the bidirectional switch 20, and a drain of the transistor 22 corresponds to the second terminal of the bidirectional switch 20. Gates of the transistors 21 and 22 are both connected to a first tap T41 of the secondary winding 142. A source and a backgate of the transistor 21 and a source and a backgate of the transistor 22 are all connected to a second tap T42 of the secondary winding 142. Though not expressly shown, the transistors 21 and 22 each have a parasitic diode present between the source and the drain.

When a positive control voltage V141 (T31>T32) is fed from the control circuit 70 to the primary winding 141, a likewise positive induced voltage V142 (T41>T42) appears in the secondary winding 142. As a result, the gate-source voltages of both of the transistors 21 and 22 become higher than their respective on-threshold voltages, and thus the transistors 21 and 22 turn on. This state corresponds to a state where the bidirectional switch 20 is on.

On the other hand, when a negative control voltage V141 (T31<T32) is fed from the control circuit 70 to the primary winding 141, a likewise negative induced voltage V142 (T41<T42) appears in the secondary winding 142. As a result, the gate-source voltages of both of the transistors 21 and 22 become lower than their respective on-threshold voltages, and thus the transistors 21 and 22 turn off. This state corresponds to a state where the bidirectional switch 20 is off.

With the configuration described above where the bidirectional switch 20 is driven via the pulse transformer 140, the control circuit 70 can be isolated from the primary circuit system 1p, to which a high voltage is applied. It is thus possible to lower the withstand voltage of the control circuit 70.

However, in an application where the voltage applied to the primary circuit system 1p is not very high, it is possible to use, as the bidirectional switch 20, a CMOS analog switch composed of a PMOSFET and an NMOSFET connected in parallel (that is, what is called a CMOS transfer gate).

It is also possible to use a GaN power device or the like that has no parasitic diode. It is then possible to build the bidirectional switch 20 with a single switching device.

Fifteenth Embodiment

Figure 27:
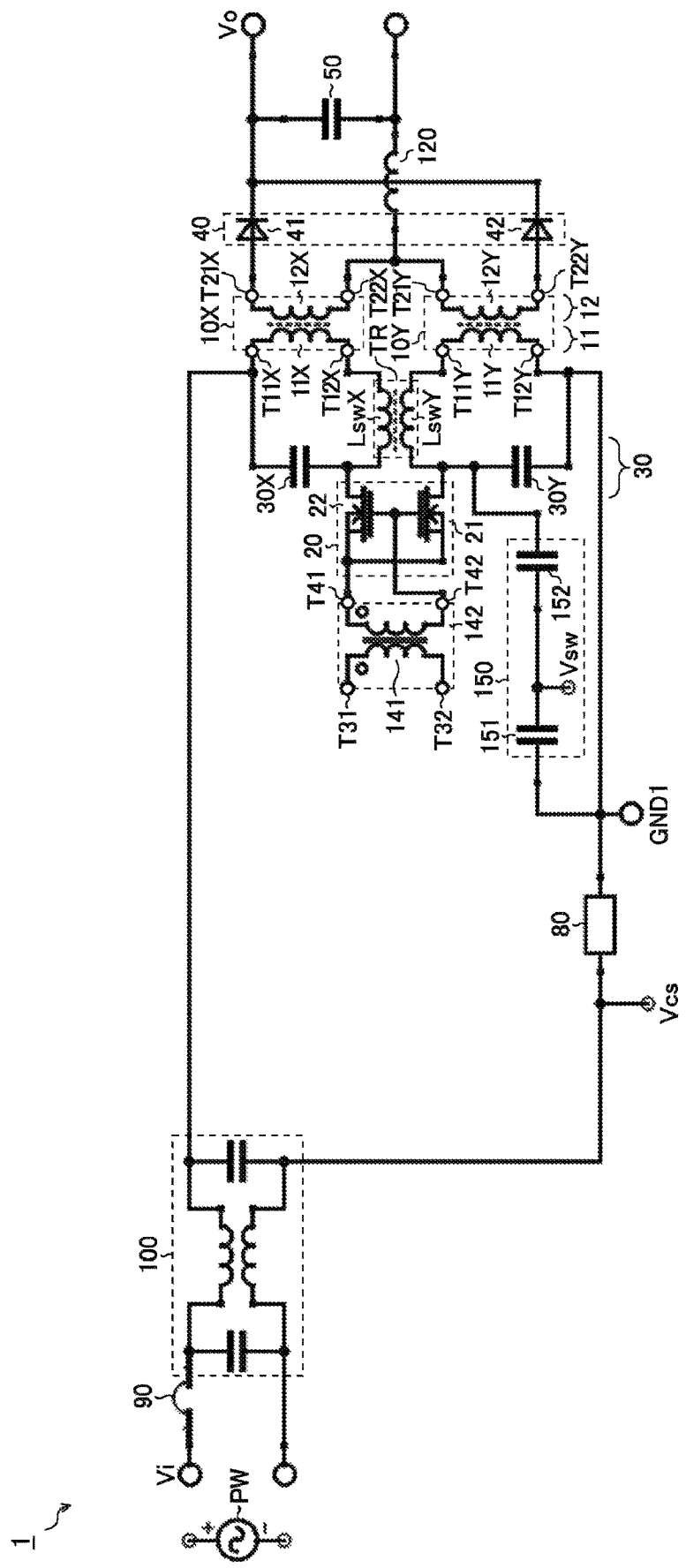
FIG. 27 is a circuit diagram of an AC-DC converter according to a fifteenth embodiment.

FIG. 27 is a circuit diagram of an AC-DC converter according to a fifteenth embodiment. This embodiment is based on the previously described sixth embodiment (FIG. 17), and is so modified that, as in the previously described fourteenth embodiment (FIG. 25), inductors LswX and LswY of a swinging (choke) type are connected in series with the primary windings 11X and 11Y respectively. It is thus possible to optimize the ZVS of the bidirectional switch 20 and thereby improve the efficiency of the AC-DC converter 1, and also to lower the withstand voltage of the bidirectional switch 20.

The inductors LswX and LswY can be configured as a transformer TR in which they are electromagnetically coupled together. The transformer TR may be omitted, in which case the leakage inductances of the transformers 10X and 10Y can be used as inductances of a swinging (choke) type.

Using as resonance inductance components inductances of a swinging (choke) type as described above can be implemented, as necessary, in combination with any of the embodiments.

<Overview>

To follow is an overview of the various embodiments disclosed herein.

According to one aspect of what is disclosed herein, an AC-DC converter includes: a primary winding to which an alternating-current input voltage is applied; a secondary winding which is magnetically coupled with the primary winding; a bidirectional switch which is connected in series with the primary winding; a resonance capacitor which is connected in parallel with at least one of the bidirectional switch and the primary winding; a resonance inductance component; a full-wave rectification circuit which performs full-wave rectification on an induced voltage that appears in the secondary winding; and a smoothing capacitor which smoothes the output of the full-wave rectification circuit. The AC-DC converter converts the alternating-current input voltage directly into a direct-current output voltage by extracting both a forward voltage and a flyback voltage from the secondary winding. The AC-DC converter further includes a switch which switches either the number of turns of the primary winding or both the number of turns of the primary winding and the capacitance value of the resonance capacitor (a first configuration).

In the AC-DC converter of the first configuration, preferably, the primary winding has a third tap between a first tap and a second tap, and the switch switches whether to apply the alternating-current input voltage to the first tap or the third tap (a second configuration).

In the AC-DC converter of the second configuration, preferably, the switch includes: a first switch having a common node connected to an application terminal of the alternating-current input voltage, and having a first selection node connected to the first tap; and a second switch having a common node connected to a second selection node of the first switch, having a first selection node left open, and having a second selection node connected to the third tap. Preferably, the resonance capacitor includes: a first resonance capacitor connected between the common node of the first switch and the common node of the second switch; and a second resonance capacitor connected between the common node of the second switch and the second tap (a third configuration).

In the AC-DC converter of the second configuration, preferably, the switch has a common node connected to an application terminal of the alternating-current input voltage, has a first selection node connected to the first tap, and has a second selection node connected to the third tap. Preferably, the resonance capacitor includes: a first resonance capacitor connected between the common node of the switch and the third tap; and a second resonance capacitor connected between the third tap and the second tap (a fourth configuration).

According to another aspect of what is disclosed herein, an AC AC-DC converter includes: a primary winding to which an alternating-current input voltage is applied; a secondary winding which is magnetically coupled with the primary winding; a bidirectional switch which is connected in series with the primary winding; a resonance capacitor which is connected in parallel with at least one of the bidirectional switch and the primary winding; a resonance inductance component; a full-wave rectification circuit which performs full-wave rectification on an induced voltage that appears in the secondary winding; and a smoothing capacitor which smoothes the output of the full-wave rectification circuit. The AC-DC converter converts the alternating-current input voltage directly into a direct-current output voltage by extracting both a forward voltage and a flyback voltage from the secondary winding. The primary winding includes a first primary winding and a second primary winding, and the bidirectional switch is connected in series between the first and second primary windings (a fifth configuration).

In the AC-DC converter of the fifth configuration, preferably, the resonance capacitor includes: a first resonance capacitor connected in parallel with the first primary winding; and a second resonance capacitor connected in parallel with the second primary winding (a sixth configuration).

In the AC-DC converter of the fifth or sixth configuration, preferably, the secondary winding is magnetically coupled with both the first and second primary windings via a common core (a seventh configuration).

In the AC-DC converter of the fifth or sixth configuration, preferably, the secondary winding includes: a first secondary winding magnetically coupled with the first primary winding; and a second secondary winding magnetically coupled with the second primary winding (an eighth configuration).

According to yet another aspect of what is disclosed herein, an AC-DC converter includes: a primary winding to which an alternating-current input voltage is applied; a secondary winding which is magnetically coupled with the primary winding; a bidirectional switch which is connected in series with the primary winding; a resonance capacitor which is connected in parallel with at least one of the bidirectional switch and the primary winding; a resonance inductance component; a full-wave rectification circuit which performs full-wave rectification on an induced voltage that appears in the secondary winding; and a smoothing capacitor which smoothes the output of the full-wave rectification circuit. The AC-DC converter converts the alternating-current input voltage directly into a direct-current output voltage by extracting both a forward voltage and a flyback voltage from the secondary winding. The AC-DC converter further includes a switch which switches either the number of turns of the primary winding or both the number of turns of the primary winding and the capacitance value of the resonance capacitor. The primary winding includes a first primary winding and a second primary winding, and the bidirectional switch is connected in series between the first and second primary windings (a ninth configuration).

In the AC-DC converter of the ninth configuration, preferably, the first primary winding has a third tap between a first tap and a second tap. Preferably, the bidirectional switch is connected between the second tap of the first primary winding and a first tap of the second primary winding. Preferably, the switch includes: a first switch having a common node connected to an application terminal of the alternating-current input voltage, having a first selection node connected to the first tap of the first primary winding, and having a second selection node connected to the third tap of the first primary winding; and a second switch having a common node connected to a primary-side common, having a first selection node connected to a second tap of the second primary winding, and having a second selection node connected to the first tap of the second primary winding (a tenth configuration).

In the AC-DC converter of the ninth configuration, preferably, the first and second primary windings each have a third tap between a first tap and a second tap. Preferably, the bidirectional switch is connected between the second tap of the first primary winding and the first tap of the second primary winding. Preferably, the switch includes: a first switch having a common node connected to an application terminal of the alternating-current input voltage, having a first selection node connected to the first tap of the first primary winding, and having a second selection node connected to the third tap of the first primary winding; and a second switch having a common node connected to a primary-side common, having a first selection node connected to the second tap of the second primary winding, and having a second selection node connected to the third tap of the second primary winding (an eleventh tenth configuration).

In the AC-DC converter of the ninth configuration, preferably, the switch has a common node connected to the bidirectional switch, has a first selection node connected to a first tap of the second primary winding, and has a second selection node connected to a second tap of the second primary winding (a twelfth configuration).

In the AC-DC converter of the ninth configuration, preferably, the bidirectional switch is connected between a second tap of the first primary winding and a first tap of the second primary winding. Preferably, the switch has a common node connected to a primary-side common, has a first selection node connected to a second tap of the second primary winding, and has a second selection node connected to a first tap of the second primary winding (a thirteenth configuration).

In the AC-DC converter of any of the first to thirteenth configurations, preferably, the resonance inductance component is a coil connected between a center tap of the secondary winding and a secondary-side common (a fourteenth configuration).

The AC-DC converter of any of the first to fourteenth configurations preferably further includes a control circuit configured to turn on the bidirectional switch when the terminal-to-terminal voltage across the bidirectional switch, or a division voltage thereof, becomes zero (a fifteenth configuration).

The AC-DC converter of the fifteenth configuration preferably further includes a capacitance voltage-division circuit configured to generate the division voltage by capacitively dividing the terminal-to-terminal voltage across the bidirectional switch (a sixteenth configuration).

In the AC-DC converter of the sixteenth configuration, preferably, the capacitance voltage-division circuit includes a first capacitor and a second capacitor which are connected in series with each other across the bidirectional switch, and the capacitance voltage-division circuit outputs the division voltage from the connection node between the first and second capacitors (a seventeenth configuration).

In the AC-DC converter of the seventeenth configuration, preferably, one terminal of the first capacitor is connected to a reference potential terminal of the control circuit (an eighteenth configuration).

In the AC-DC converter of the eighteenth configuration, preferably, the capacitance voltage-division circuit further includes a discharge switch which is connected in parallel with the first capacitor (a nineteenth configuration).

In the AC-DC converter of the nineteenth configuration, preferably, the capacitance voltage-division circuit further includes a voltage source which is connected in series with the discharge switch (a twentieth configuration).

In the AC-DC converter of any of the first to twentieth configurations, preferably, the resonance inductance component is a resonance inductance component of a swinging type of which the inductance value decreases as current increases (a twenty-first configuration).

In the AC-DC converter of any of the first to twenty-first configurations, preferably, the bidirectional switch is driven via a pulse transformer (a twenty-second configuration).

FURTHER MODIFICATIONS

The various technical features disclosed herein may be implemented in any other manner than in the embodiments described above, and allow for many modifications without departing from the spirit of the present invention. That is, the embodiments descried above should be understood to be in every aspect illustrative and not restrictive. The technical scope of the present invention is defined not by the description of the embodiments given above but by the appended claims, and should be understood to encompass any modifications made in the sense and scope equivalent to those of the claims.

What is claimed is:

1. An AC-DC converter comprising:
    a primary winding to which an alternating-current input voltage is applied;
    a secondary winding which is magnetically coupled with the primary winding;
    a bidirectional switch which is connected in series with the primary winding;
    a resonance capacitor which is connected in parallel with at least one of the bidirectional switch and the primary winding;
    a resonance inductance component;
    a full-wave rectification circuit which performs full-wave rectification on an induced voltage that appears in the secondary winding; and
    a smoothing capacitor which smoothes an output of the full-wave rectification circuit,
    wherein
    the AC-DC converter converts the alternating-current input voltage directly into a direct-current output voltage by extracting both a forward voltage and a flyback voltage from the secondary winding, and
    the AC-DC converter further comprises a switch which switches either a number of turns of the primary winding or both the number of turns of the primary winding and a capacitance value of the resonance capacitor.

2. The AC-DC converter according to claim 1, wherein the primary winding has a third tap between a first tap and a second tap, and
    the switch switches whether to apply the alternating-current input voltage to the first tap or the third tap.

3. The AC-DC converter according to claim 2, wherein the switch includes:
    a first switch having a common node thereof connected to an application terminal of the alternating-current input voltage, the first switch having a first selection node thereof connected to the first tap; and
    a second switch having a common node thereof connected to a second selection node of the first switch, the second switch having a first selection node thereof left open, the second switch having a second selection node thereof connected to the third tap,
    the resonance capacitor includes:
    a first resonance capacitor connected between the common node of the first switch and the common node of the second switch; and
    a second resonance capacitor connected between the common node of the second switch and the second tap.

4. The AC-DC converter according to claim 2, wherein the switch has a common node thereof connected to an application terminal of the alternating-current input voltage, the switch having a first selection node thereof connected to the first tap, the switch having a second selection node thereof connected to the third tap, and the resonance capacitor includes:
 a first resonance capacitor connected between the common node of the switch and the third tap; and
 a second resonance capacitor connected between the third tap and the second tap.

5. The AC-DC converter according to claim 1, wherein the resonance inductance component is a coil connected between a center tap of the secondary winding and a secondary-side common.

6. The AC-DC converter according to claim 1, further comprising:
 a control circuit configured to turn on the bidirectional switch when a terminal-to-terminal voltage across the bidirectional switch, or a division voltage thereof, becomes zero.

7. The AC-DC converter according to claim 6, further comprising:
 a capacitance voltage-division circuit configured to generate the division voltage by capacitively dividing the terminal-to-terminal voltage across the bidirectional switch.

8. The AC-DC converter according to claim 7, wherein the capacitance voltage-division circuit includes a first capacitor and a second capacitor which are connected in series with each other across the bidirectional switch, the capacitance voltage-division circuit outputting the division voltage from a connection node between the first and second capacitors.

9. The AC-DC converter according to claim 8, wherein one terminal of the first capacitor is connected to a reference potential terminal of the control circuit.

10. The AC-DC converter according to claim 9, wherein the capacitance voltage-division circuit further includes a discharge switch which is connected in parallel with the first capacitor.

11. The AC-DC converter according to claim 10, wherein the capacitance voltage-division circuit further includes a voltage source which is connected in series with the discharge switch.

12. The AC-DC converter according to claim 1, wherein the resonance inductance component is a resonance inductance component of a swinging type of which an inductance value decreases as current increases.

13. The AC-DC converter according to claim 1, wherein the bidirectional switch is driven via a pulse transformer.

14. An AC-DC converter comprising:
 a primary winding to which an alternating-current input voltage is applied;
 a secondary winding which is magnetically coupled with the primary winding;
 a bidirectional switch which is connected in series with the primary winding;
 a resonance capacitor which is connected in parallel with at least one of the bidirectional switch and the primary winding;
 a resonance inductance component;
 a full-wave rectification circuit which performs full-wave rectification on an induced voltage that appears in the secondary winding; and
 a smoothing capacitor which smoothes an output of the full-wave rectification circuit,
wherein
 the AC-DC converter converts the alternating-current input voltage directly into a direct-current output voltage by extracting both a forward voltage and a flyback voltage from the secondary winding,
 the AC-DC converter further comprises a switch which switches either a number of turns of the primary winding or both the number of turns of the primary winding and a capacitance value of the resonance capacitor,
 the primary winding includes a first primary winding and a second primary winding, and
 the bidirectional switch is connected in series between the first and second primary windings.

15. The AC-DC converter according to claim 14, wherein the first primary winding has a third tap between a first tap and a second tap,
 the bidirectional switch is connected between the second tap of the first primary winding and a first tap of the second primary winding, and
 the switch includes:
 a first switch having a common node thereof connected to an application terminal of the alternating-current input voltage, the first switch having a first selection node thereof connected to the first tap of the first primary winding, the first switch having a second selection node thereof connected to the third tap of the first primary winding; and
 a second switch having a common node thereof connected to a primary-side common, the second switch having a first selection node thereof connected to a second tap of the second primary winding, the second switch having a second selection node thereof connected to the first tap of the second primary winding.

16. The AC-DC converter according to claim 14, wherein the first and second primary windings each have a third tap between a first tap and a second tap,
 the bidirectional switch is connected between the second tap of the first primary winding and the first tap of the second primary winding, and
 the switch includes:
 a first switch having a common node thereof connected to an application terminal of the alternating-current input voltage, the first switch having a first selection node thereof connected to the first tap of the first primary winding, the first switch having a second selection node thereof connected to the third tap of the first primary winding; and
 a second switch having a common node thereof connected to a primary-side common, the second switch having a first selection node thereof connected to the second tap of the second primary winding, the second switch having a second selection node thereof connected to the third tap of the second primary winding.

17. The AC-DC converter according to claim 14, wherein the switch has a common node thereof connected to the bidirectional switch, the switch having a first selection node thereof connected to a first tap of the second primary winding, the switch having a second selection node thereof connected to a second tap of the second primary winding.

18. The AC-DC converter according to claim 14, wherein the bidirectional switch is connected between a second tap of the first primary winding and a first tap of the second primary winding; and the switch has a common node thereof connected to a primary-side common, the switch having a first selection node thereof connected to a second tap of the second primary winding, the switch having a second selection node thereof connected to a first tap of the second primary winding.

\* \* \* \* \*